(12) United States Patent
Jager et al.

(10) Patent No.: US 9,079,255 B2
(45) Date of Patent: Jul. 14, 2015

(54) LATHE TOOL, IN PARTICULAR BORING TOOL

(75) Inventors: Horst Manfred Jager, Nurnberg (DE); Berthold Heinrich Zeug, Furth (DE)

(73) Assignee: KENNAMETAL INC., Latrobe, PA (US)

( * ) Notice: Subject to any disclaimer, the term of this patent is extended or adjusted under 35 U.S.C. 154(b) by 938 days.

(21) Appl. No.: 12/933,896

(22) PCT Filed: Apr. 2, 2009

(86) PCT No.: PCT/EP2009/002405
§ 371 (c)(1),
(2), (4) Date: Dec. 6, 2010

(87) PCT Pub. No.: WO2009/121595
PCT Pub. Date: Oct. 8, 2009

(65) Prior Publication Data
US 2011/0097168 A1    Apr. 28, 2011

(30) Foreign Application Priority Data
Apr. 3, 2008 (DE) .......................... 10 2008 017 540
Jun. 6, 2008 (DE) .......................... 10 2008 027 159

(51) Int. Cl.
*B23B 51/02* (2006.01)

(52) U.S. Cl.
CPC ............. *B23B 51/02* (2013.01); *B23B 2250/12* (2013.01); *B23B 2251/02* (2013.01);
(Continued)

(58) Field of Classification Search
CPC .. B23B 51/02; B23B 2251/02; B23B 2251/50
USPC .......... 408/144, 226, 227, 230, 231, 233, 713
See application file for complete search history.

(56) References Cited

U.S. PATENT DOCUMENTS 1,746,716 A * 2/1930 Sasse ............................... 408/59
2,259,611 A   10/1941 Burger
(Continued)

FOREIGN PATENT DOCUMENTS

DE   102006012382 A1 * 9/2007
DE   102009013580 A1 * 9/2010 .............. B23B 51/02
(Continued)

OTHER PUBLICATIONS

Machine English translations of German patent DE 10 2006 012382 by Jaeger et al., Sep. 20, 2007.*
(Continued)

*Primary Examiner* — Daniel Howell
*Assistant Examiner* — Chwen-Wei Su
(74) *Attorney, Agent, or Firm* — Larry R. Meenan

(57) ABSTRACT

A boring tool has a receiving part implemented as a borer body and a front part implemented as a borer head, which extend along a central axis and can be removably fastened to one another via driver connection. The driver connection has at least two coupling pairs which are separate from one another and are disposed eccentrically relative to the central axis. Each coupling pair is formed by interlocking coupling elements, namely a receiving pocket and a driver pin. The coupling elements have an asymmetrical cross-sectional area and widen with increasing distance to the central axis. Through this design, a reliable transmission of high torques is achieved with lower strains of the borer body in the area of the driver connection. Simultaneously, an automatic centering of the two tool parts to one another is performed.

26 Claims, 25 Drawing Sheets

(52) U.S. Cl.
CPC ........ *B23B 2251/50* (2013.01); *B23B 2251/70* (2013.01); *Y10S 408/713* (2013.01); *Y10T 408/78* (2015.01); *Y10T 408/892* (2015.01); *Y10T 408/907* (2015.01); *Y10T 408/909* (2015.01); *Y10T 408/9097* (2015.01); *Y10T 408/90993* (2015.01)

(56) References Cited

U.S. PATENT DOCUMENTS

| | | | | |
|---|---|---|---|---|
| 4,856,944 | A * | 8/1989 | Reinauer | 408/59 |
| 4,950,108 | A * | 8/1990 | Roos | 408/59 |
| 6,012,881 | A * | 1/2000 | Scheer | 408/227 |
| 6,059,492 | A * | 5/2000 | Hecht | 408/144 |
| 6,582,164 | B1 * | 6/2003 | McCormick | 408/226 |
| 6,840,717 | B2 * | 1/2005 | Eriksson | 408/1 R |
| 7,972,094 | B2 * | 7/2011 | Men et al. | 408/231 |
| 2002/0114675 | A1 | 8/2002 | Krenzer | |
| 2003/0118415 | A1 | 6/2003 | Feld | |
| 2005/0133487 | A1 | 6/2005 | Nystrom et al. | |
| 2005/0232716 | A1 * | 10/2005 | Brink | 408/231 |
| 2009/0044986 | A1 | 2/2009 | Jaeger et al. | |

FOREIGN PATENT DOCUMENTS

| | | | | |
|---|---|---|---|---|
| EP | 1273373 | A1 * | 1/2003 | .............. B23B 51/02 |
| WO | WO 2004009285 | A1 * | 1/2004 | .............. B23K 35/02 |

OTHER PUBLICATIONS

European Patent Office, Communication directed to patent family member EP 10 00 9426, dated Mar. 25, 2011, 4 pp.

* cited by examiner

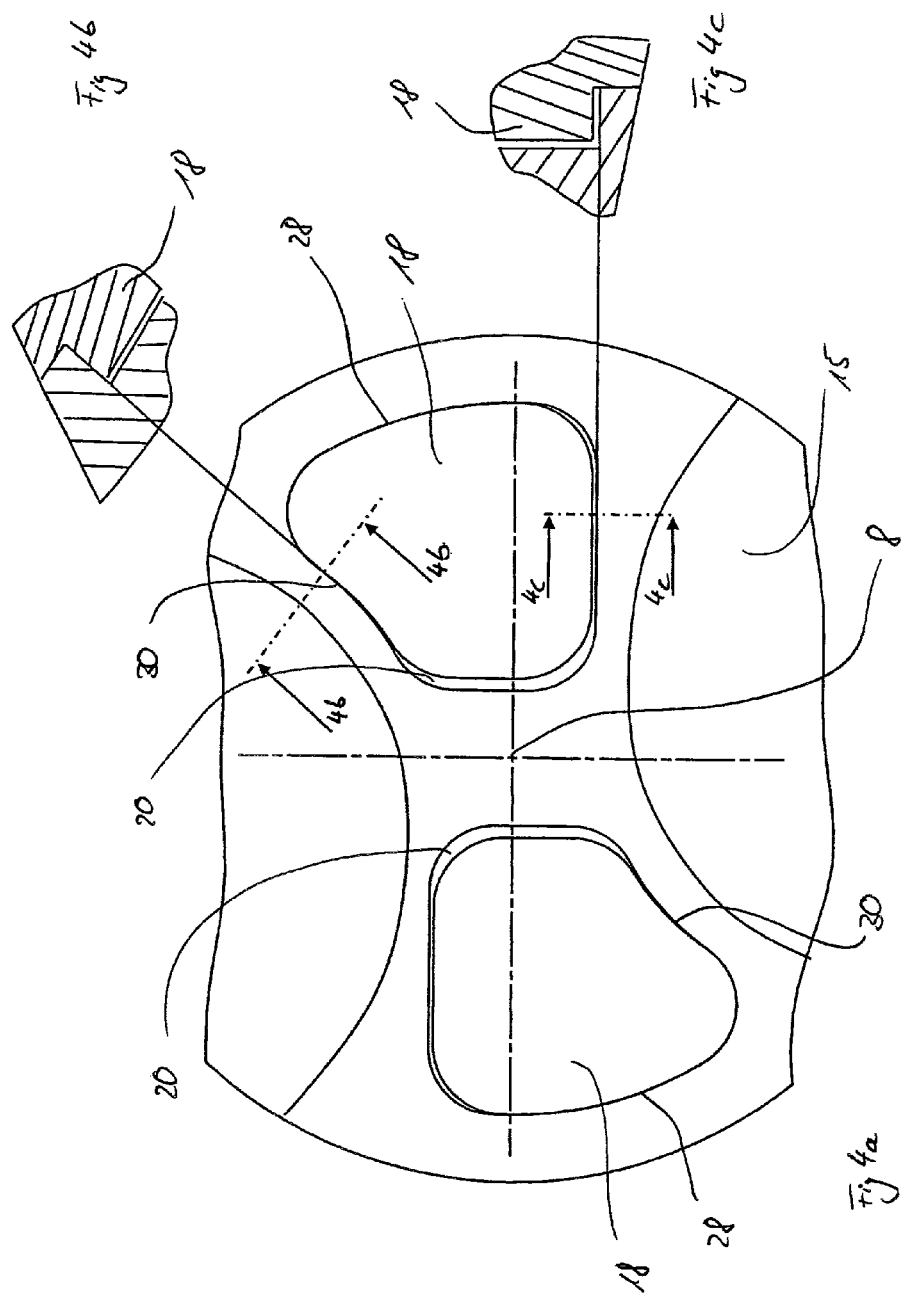

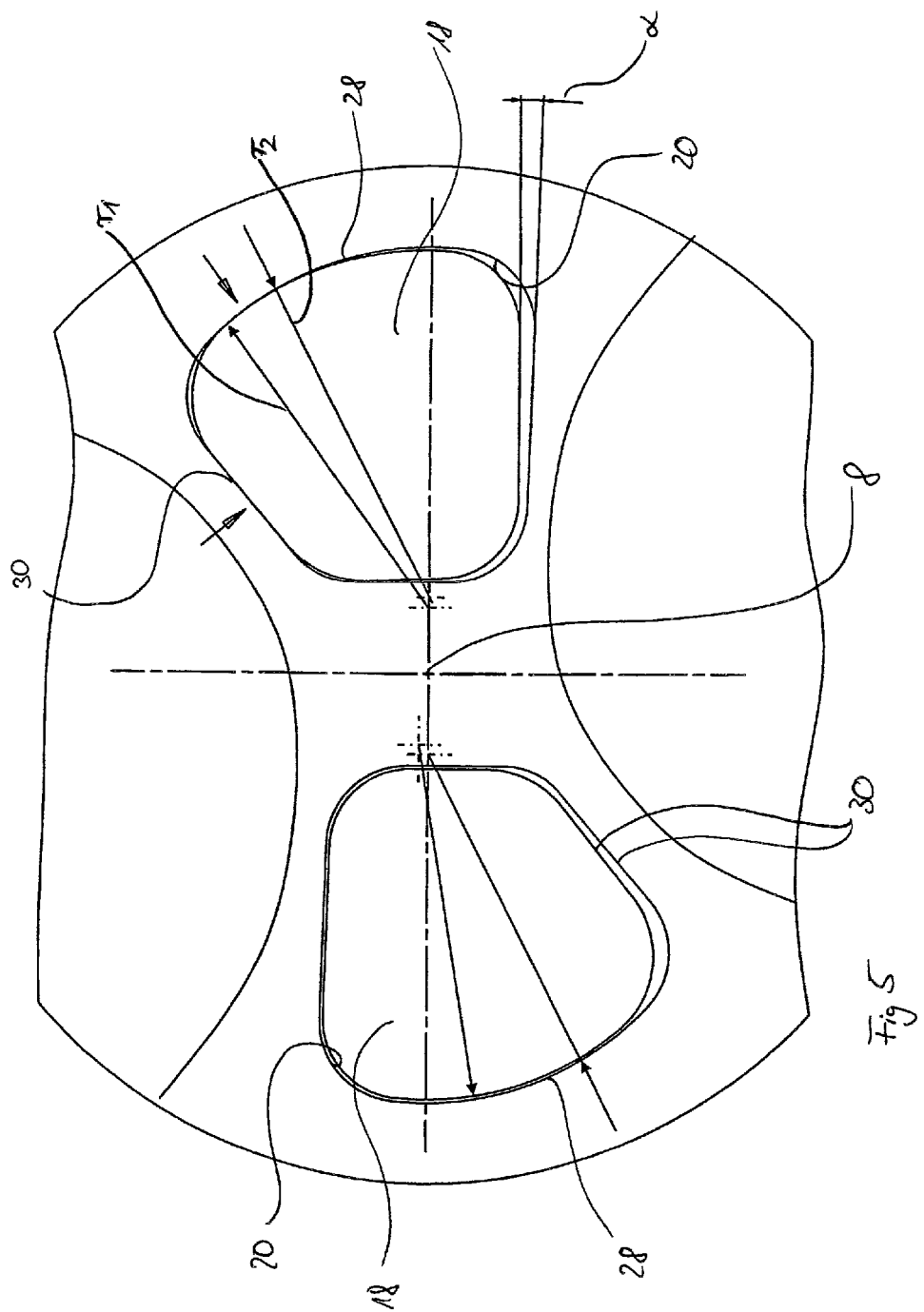

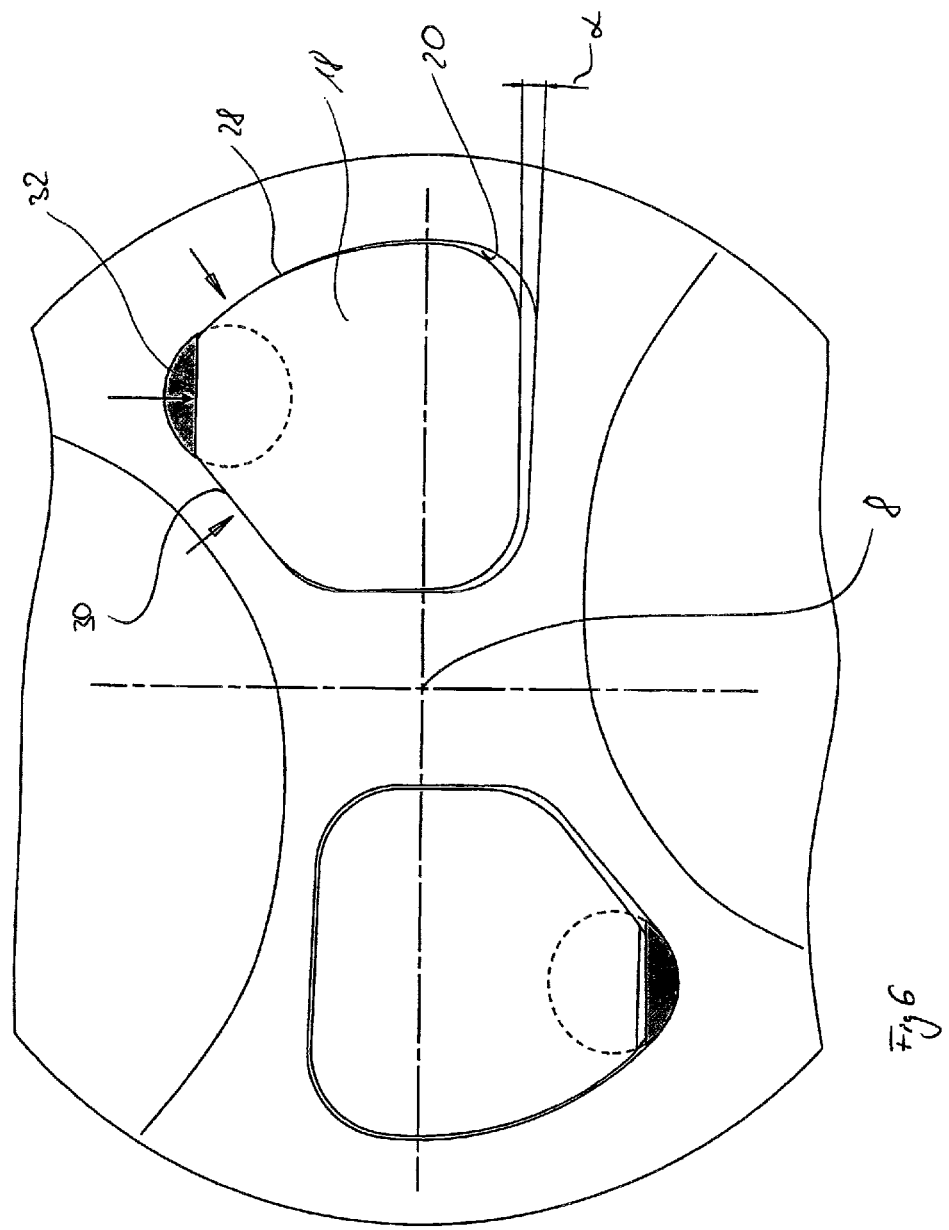

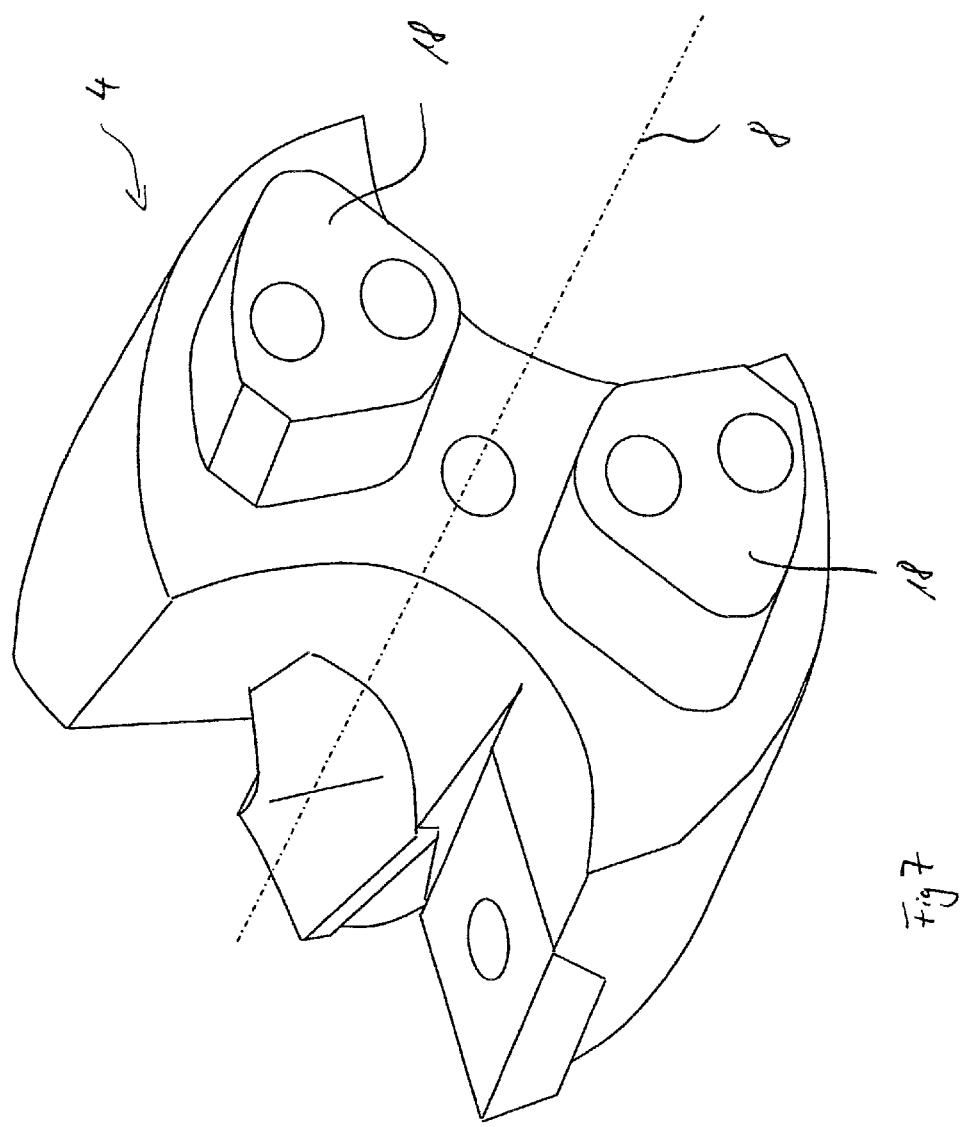

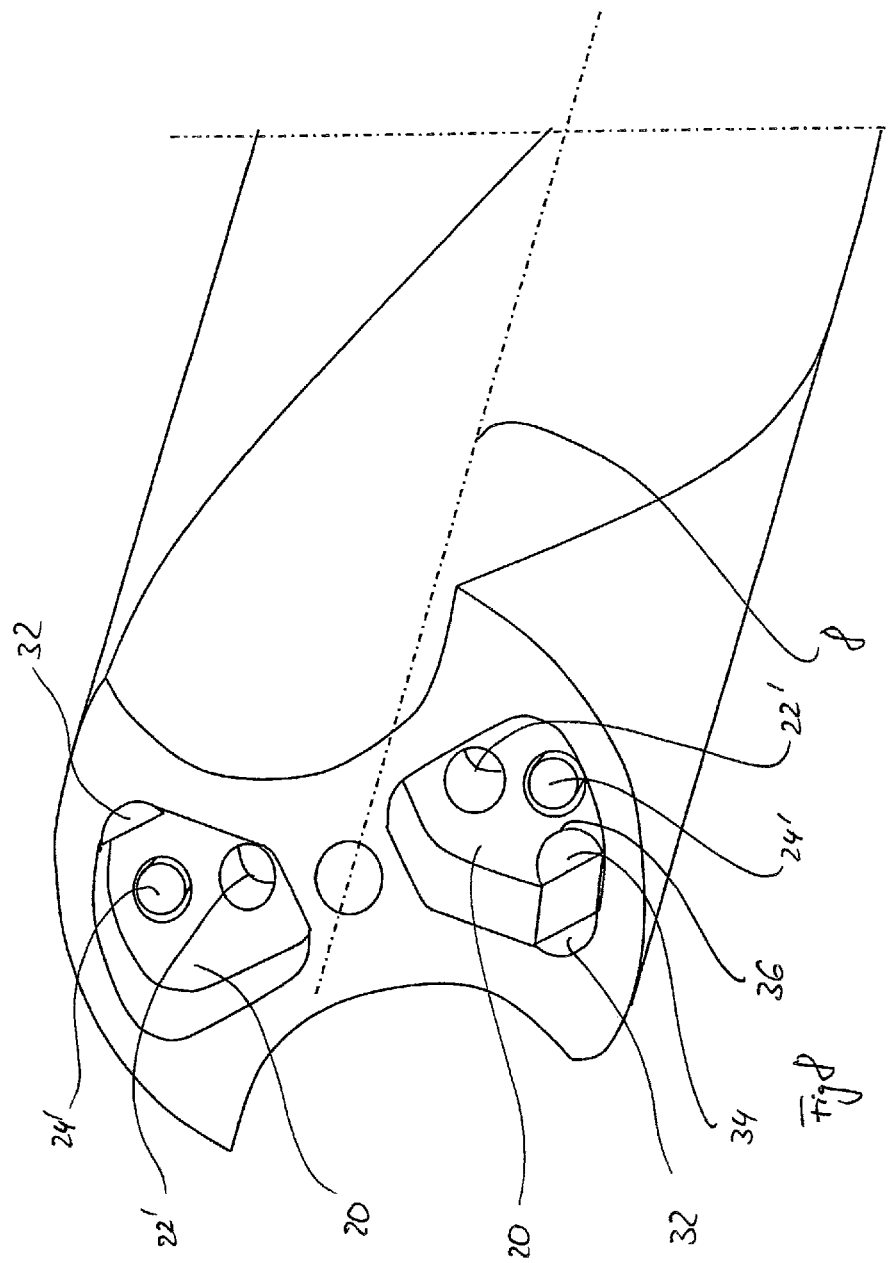

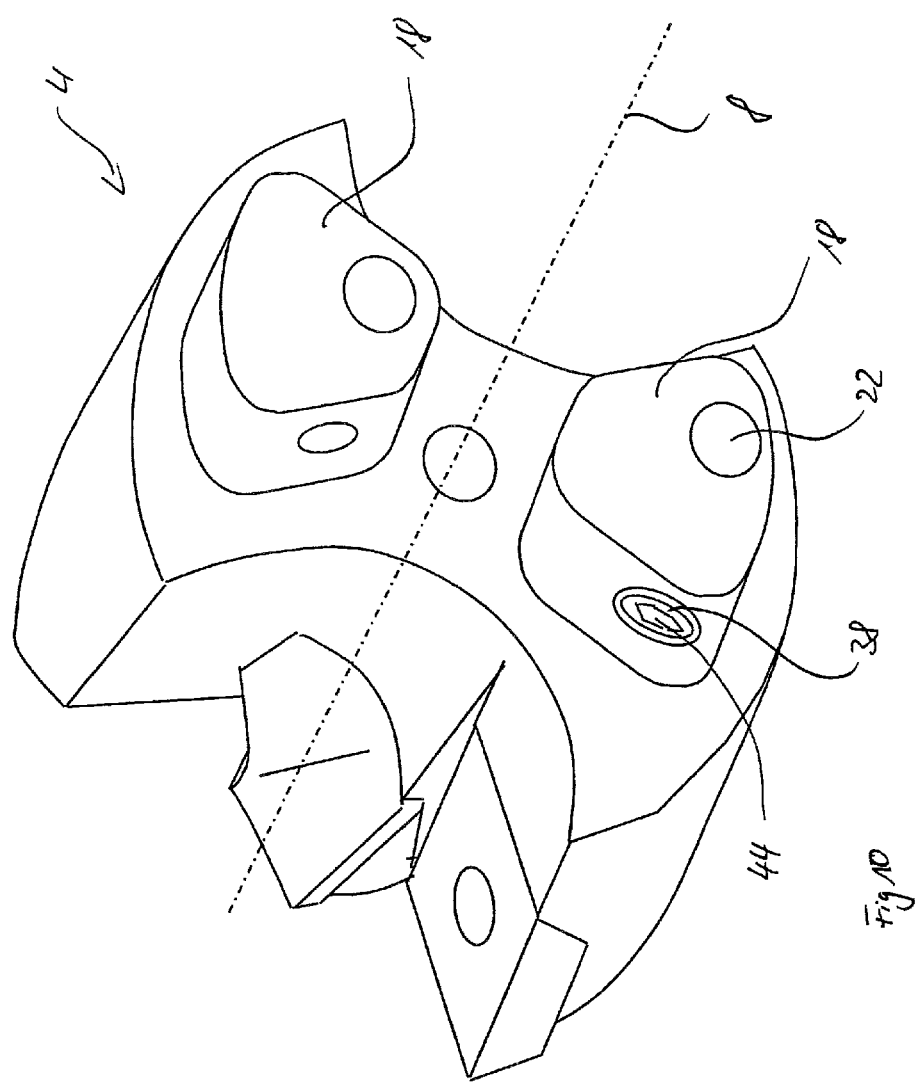

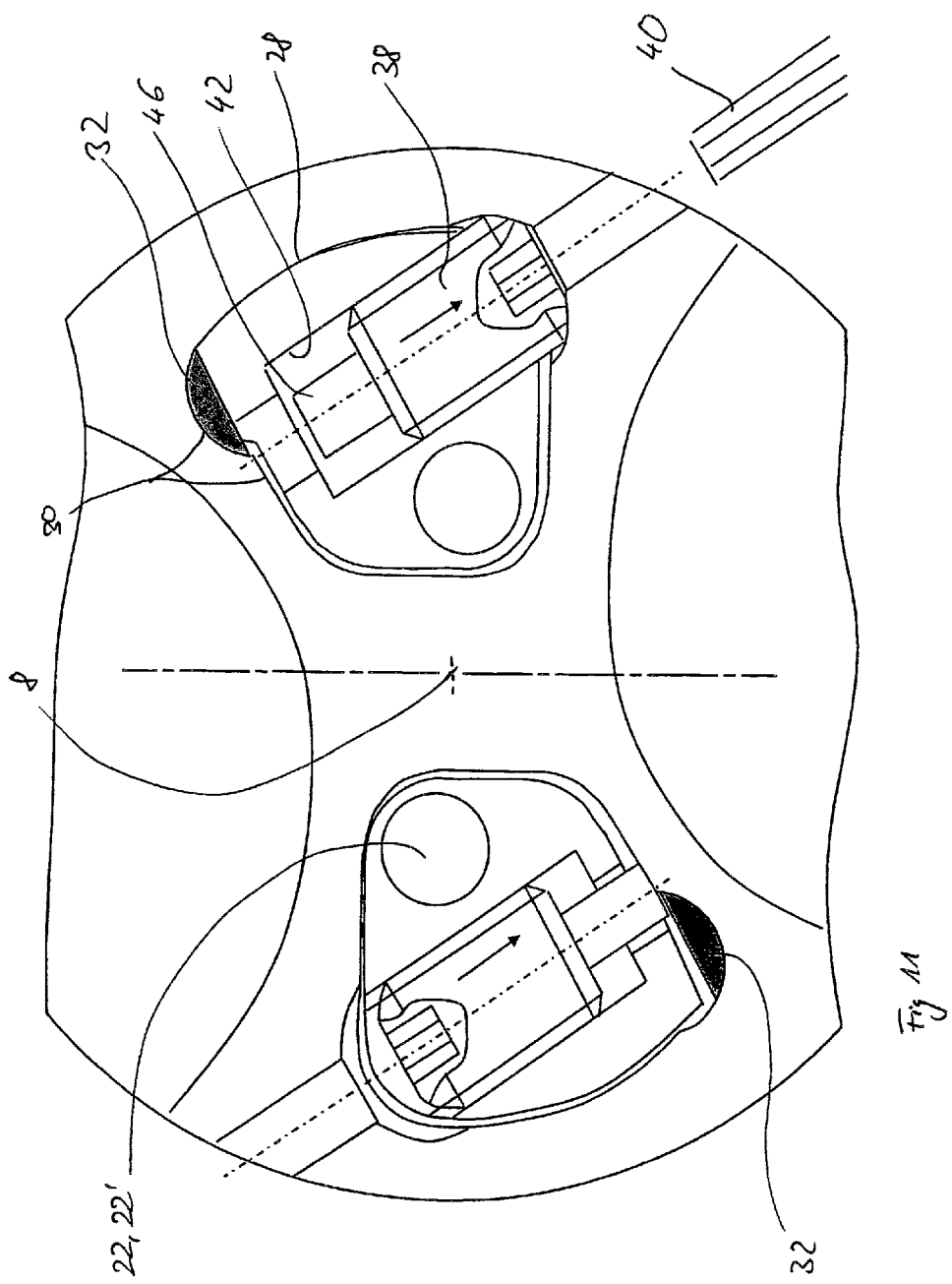

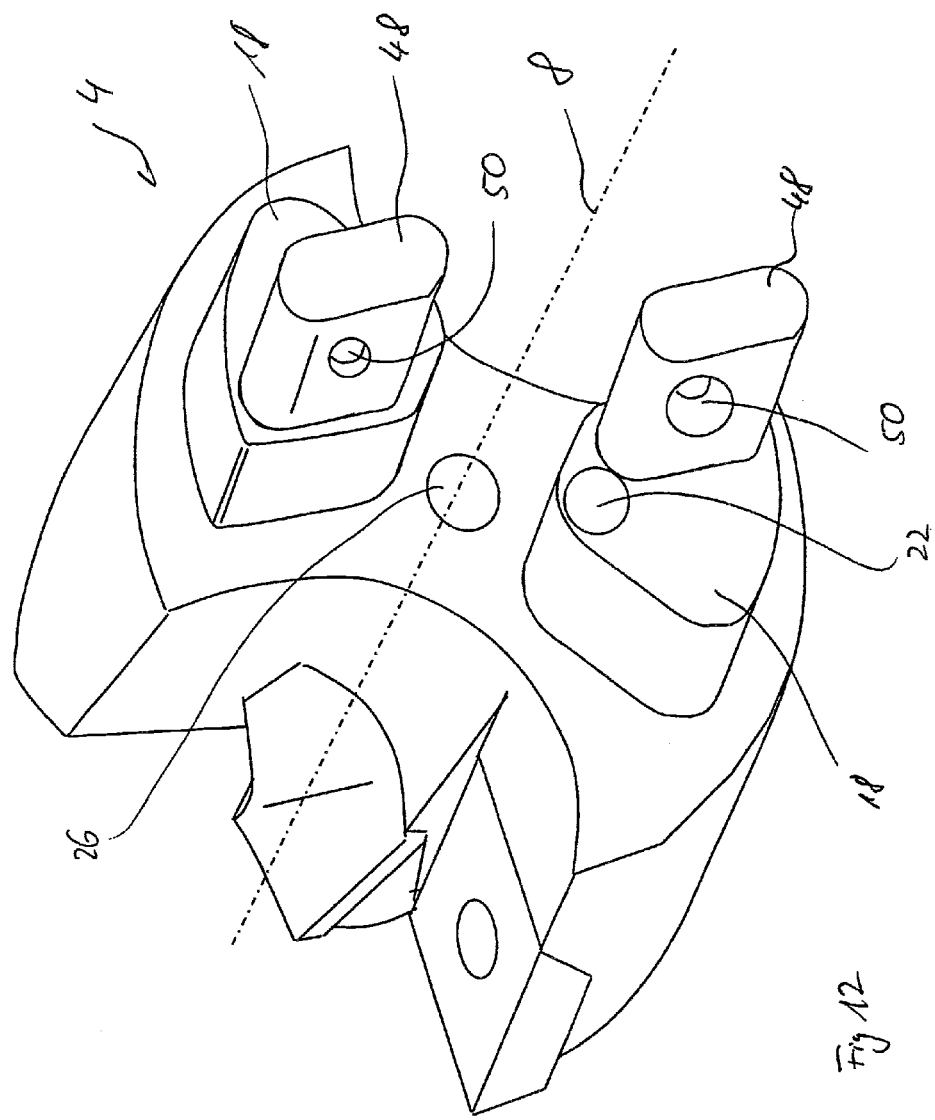

LATHE TOOL, IN PARTICULAR BORING TOOL

BACKGROUND OF THE INVENTION a) Field of the Invention

The invention relates to a rotating cutting tool, in particular a boring tool, comprising a receiving part and a front part which extend along a center axis and are detachably fastened to one another via a driver connection.

b) Description of the Related Art

Such a cutting tool designed as a boring tool can be seen from WO 2007/107294 A1. This boring tool is a modular cutting tool which has an interchangeable tool head which can be detachably connected to a fluted boring body via the driver connection. The driver connection in this case comprises a driver web arranged on the underside of the boring head and extending across a center longitudinal axis. Said driver web is inserted into a receiving pocket, corresponding to the shape of the driver web, of the boring body. The receiving pocket in this case encloses the driver web over the full circumference.

The driver connection generally serves to transmit torque between the two tool parts. In such driver connections, there is often a conflict between as robust a driver web as possible for the torque transmission and as little weakening of the boring body as possible.

The object of the invention is to specify a tool of the type mentioned at the beginning having an improved driver connection which is designed for the transmission of high torques and at the same time causes only slight weakening of the receiving part in order thus to ensure stable return of the tool.

SUMMARY OF THE INVENTION

The object is achieved according to the invention by a tool having the features of claim 1. The tool is generally a rotary tool for machining a workpiece. The tool is of multi-piece, in particular of two-piece, design and comprises a receiving part and a front part. In the case of a boring tool, the receiving part is the boring body and the front part is the boring head. In the case of a milling tool, the receiving part would be a milling cutter shank and the front part would be a milling cutter head. These two parts extending along a center axis (axial direction) are detachably fastened to one another via a driver connection. The latter has two coupling pairs separate from one another and arranged eccentrically with respect to the center axis. Each of the coupling pairs is in this case formed by two interlocking coupling elements, namely, on the one hand, a driver pin and, on the other hand, a receiving pocket completely enclosing said driver pin. The coupling elements serve firstly to transmit the torque forces between the two parts. Secondly, the two coupling elements also serve to orient the two parts in alignment with one another; i.e. the two parts are centered relative to one another and with respect to the center axis via the coupling elements. With regard to this double function, the coupling elements are of asymmetrical design and widen—as viewed in the plane perpendicular to the center axis—with increasing distance from the center axis. Due to the asymmetrical configuration, automatic centering of the two parts is achieved, in particular when the two parts are being fitted together. At the same time, with the widening with increasing radial distance from the center axis, the driver connection is designed to be especially strong in the radially outer regions, such that high torque forces can be transmitted.

The expression "asymmetrical configuration" of the coupling elements refers in this case in particular to the fact that said coupling elements have a cross-sectional area which is oriented perpendicularly to the center axis and which does not have symmetry either with regard to an axis of rotation or with regard to a plane.

A special advantage of this configuration can be seen in the fact that the two coupling pairs are separate from one another and are each arranged eccentrically with respect to the center axis. In the region of the center axis itself, therefore, the driver connection does not alter the receiving part or the front part. The two parts preferably bear on one another in a planar manner in the region of the center axis without interlocking in this region. The individual coupling pairs are therefore shifted into a radially outer region. As a result, the core of the tool is unaffected by the driver connection.

Investigations have shown that this configuration having the two eccentric coupling pairs separate from one another, compared with the configuration as described in WO 2007/107294 A1, leads to a reduction in the stresses in the boring body, that is to say in the receiving part. The loading of the receiving part—at the same or improved torque transmission—is reduced by about 20%. Furthermore, due to the separate arrangement, the center region is free, in which coolant bores, clamping screws, etc., can now be introduced without any problems. In addition, the enlarged free space around the center axis permits greater design flexibility with regard to the configuration in particular of the flutes. The latter can now be brought much closer to the center axis.

According to an expedient configuration, the driver pin in this case is designed like a prism. In the same way, the receiving pocket is also designed as a prismatic receptacle in a manner adapted to the driver pins.

The expression "designed like a prism" refers to the fact that the two coupling elements each have a roughly polygonal base area with side walls preferably extending parallel to the center axis. In particular, a base area is provided with 4 corner regions. In an expedient manner, the corner regions in this case are designed to be rounded. The connection between the individual corner regions also need not inevitably be effected rectilinearly.

The special advantage of this prismatic configuration can be seen in the fact that adjacent side walls serve for the automatic fixing or centering of the two parts. For the purpose of as robust a design as possible, provision is preferably made in this case for the extent of the respective driver pin in the radial direction to preferably be more than 50% of the radius of the tool. The two coupling elements are designed to be preferably rotationally symmetrical to one another with respect to a rotation about the center axis. In the preferred configuration having two coupling pairs, the coupling elements are therefore designed symmetrically to one another with respect to a rotation about the center axis by 180°. Alternatively, it is in principle also possible to design the coupling elements asymmetrically to one another.

According to an expedient development, the coupling elements each comprise radially outer bearing surfaces, in particular curved outer bearing surfaces, and further driver surfaces. In the load case, that is to say during torque transmission, both the outer bearing surfaces and the driver surfaces of the two coupling elements fitted one inside the other are pressed against one another. The outer bearing surfaces and the driver surfaces are in this case separate from one another. They expediently form adjacent side faces of the prism, via which side faces the self-centering is effected.

The driver surfaces are in this case preferably oriented substantially in the radial direction in order to enable as optimum a force transmission as possible for the torque driving. The expression "oriented substantially in the radial direction" refers in this case in particular to the fact that the driver surfaces are oriented at most at an angle of +/−20°, preferably +/−10°, with respect to the radial.

The receiving pocket expediently has an outer web which comprises the outer bearing surface and widens in the direction of that region of the outer bearing surface which is loaded in the load case. In this case, the outer web, with its outer side, at the same time also forms the outer side of the tool. The outer bearing surface running substantially concentrically to the outer lateral surface of the tool therefore deviates, according to the preferred configuration, from the concentric arrangement to the effect that the width of the wall region increases toward the loaded regions.

The receiving pocket preferably comprises at least one web-like and elastic wall region. The latter is sufficiently thin and thus elastic, such that, in the load case, when the torque forces occur, an elastic deformation of the wall region can be effected, and therefore surface contact is formed between the elastic wall region and an associated surface section of the driver pin. On account of this configuration, automatic tolerance compensation is therefore effected between the two contact surfaces between the driver pin and the receiving pocket in order to achieve a desired planar bearing surface for the torque transmission. Such tolerance inaccuracies are caused, for example, by dimensional inaccuracies during the production of the receiving pocket and/or of the driver pin. It should be taken into account here that the receiving part (boring body) is designed for many front parts (borer heads), which constitute wearing parts.

In general, the wall regions of the receiving pocket which surround the driver pin are of web-like design having a small width in comparison with the driver pin.

With regard to the desired self-centering of the two tool parts relative to one another, the two coupling elements, for assembly, have clearance relative to one another and also different cross-sectional geometries in such a way that a slight relative rotation is made possible between the two coupling elements inserted one inside the other. During such a relative rotation, the coupling elements are clamped against one another. In this case, the curved outer bearing surfaces preferably come to bear against one another. Since the two coupling elements are supported against one another in the radial direction via the outer bearing surfaces, a force component directed radially inward is exerted on the respective driver pin by this measure. Since this is effected at each coupling pair, this leads to the desired automatic centering of the two tool parts. The outer bearing surfaces of the two coupling elements of a coupling pair are preferably arranged eccentrically to one another. This refers to the fact that the outer bearing surfaces run along a circular path with a defined radius of curvature, the centers of the circles being arranged offset from one another. Different radii of curvature for the outer bearing surfaces can also be additionally provided.

In this case, the clearance is preferably selected in such a way that the two coupling elements have a free rotation angle within the range of 1-5°; that is to say they can be rotated relative to one another within a limited angular range of at most 1-5°.

At least one substantially axially running bore which is in alignment with a corresponding bore in the receiving pocket extends through the driver pin. This bore is preferably a coolant bore or also a bore for receiving a fastening means, such as a screw for example. Two bores, namely one for a coolant and one for a fastening means, in particular a clamping screw, are expediently provided in the driver pin. Both bores are in alignment with corresponding bores in the receiving pocket.

The bore provided for receiving the clamping screw is in this case expediently oriented obliquely relative to the longitudinal direction, to be precise in such a way that the two coupling elements are clamped against one another when the clamping screw is tightened. The oblique position is in this case selected in such a way that clamping is preferably effected in both the circumferential direction and the axial direction. The longitudinal axis of the bore is in this case inclined approximately in the circumferential direction, to be more precise in the clamping direction in which the driver pin is clamped against the receiving pocket. The longitudinal axis of the bore therefore runs within approximately a tangential plane, to be more precise within the plane which is defined by the axial direction and the clamping direction. The bore longitudinal axis lying in this plane has an angle of inclination relative to the axial direction of greater than 1° within the range of between 3° and 20°, preferably within the region of about 10°.

According to an expedient configuration, a compensating element extending preferably in the axial direction parallel to the center axis is arranged between the receiving pocket and the driver pin, said compensating element, in the load case, bearing against both the driver pin and the receiving pocket in a planar manner. In the load case, a force exerted by the driver pin is therefore transmitted to the receiving pocket. The compensating element is in this case in particular freely rotatable about its longitudinal axis. This compensating element serves for tolerance compensation in order to make possible desired planar contact of the surfaces participating in the transmission of force. Dimensional inaccuracies caused during production or possibly also during operation are compensated for by the compensating element.

To this end, the compensating segment preferably has a circle-segment-like cross-sectional area. The compensating segment is therefore of roughly semi-cylindrical design and has a partly cylindrical bearing surface and a flat bearing surface. Furthermore, the compensating element has a cylindrical fastening shank, with which it is inserted into a shank receptacle, designed as a bore, in the receiving pocket, in which case rotatability of the compensating element inside the shank receptacle is made possible. The compensating element is in this case preferably arranged in a corner region of the prismatic coupling elements, to be precise in particular in the corner region which connects the outer bearing surfaces to the driver surfaces. Furthermore, in order to make possible the free rotatability, provision is made in an expedient configuration for the receiving pocket to have a corner hole and for the driver pin to be flattened in the corresponding corner region. A sufficient rotary movement of the compensating element is made possible on account of the corner hole.

In this case, the compensating element and at least one of the coupling elements are preferably made of materials of different hardness. The compensating element can be softer or also harder than the at least one coupling element.

Due to the different material hardness, additional adaptation and additional tolerance compensation are made possible by plastic deformation.

According to an expedient development, in order to ensure that the two parts are reliably fastened to one another in the desired position, a clamping device is provided which can be actuated from the side and via which the driver pin can be clamped together with the receiving pocket. The expression "to clamp" in this case refers in particular to clamping both in the circumferential direction and in the axial direction, such that the two coupling elements are brought into their desired position relative to one another. This clamping device is preferably used as an alternative to the already described clamping screw which is oriented substantially in the axial direction and is actuated from the end face. The lateral clamping device, which can therefore be actuated from the lateral surface of the lathe tool and is oriented in the radial direction and also in an approximately tangential direction in the lathe tool, has the advantage that no modifications to the front part have to be made.

For the design of the clamping device, a longitudinally extending clamping pin is expediently arranged on the driver pin, said clamping pin plunging into a pin receptacle of the receiving pocket. In addition, a clamping element is provided which acts laterally on the clamping pin in order to clamp the driver pin together with the receiving pocket. Due to the additional arrangement of the clamping pin, the clamping device is isolated from the driver pin. The driver pin therefore is not weakened. The clamping pin preferably lies free of stress in the pin receptacle, even in the clamped state between the receiving pocket and the driver pin. In the clamped state, too, the clamping pin therefore has clearance relative to the pin receptacle. The clamping pin in this case is expediently arranged asymmetrically and eccentrically on the underside of the driver pin.

As an alternative to the configuration having the clamping pin, the clamping device preferably has an element, for example a threaded element such as a headless setscrew or a bolt, which is adjustably mounted in one of the coupling elements, the element being supported with one of its end faces against the other coupling element for the clamping. In the configuration as a headless setscrew, said headless setscrew is therefore screwed into or out of the respective coupling element until the headless setscrew is supported against the other coupling element and therefore clamps the two coupling elements against one another. This clamping device is again designed in such a way that clamping is effected both in the circumferential direction and in the axial direction.

The element is expediently adjustably mounted in a through-hole of the one coupling element, such that the element can also be supported with its second end face against the other coupling element. This serves to release the driver connection when coupling elements are clamped together.

A development of the invention, this development being inventive on its own, consists in mounting a supporting element in the coupling region, that is to say in the region of the parting line between borer body and borer head. The supporting element can be produced from a specially adapted material and serves to specifically stabilize the tool in the coupling region. The supporting element serves to dampen any movements or vibrations of the borer body and of the borer head relative to one another. In particular, opposed vibrations of borer head and borer body are to be reduced or neutralized in order to reduce the vibration wear of the tool. In addition, the transmission of solid-borne sound in the region of the parting line between borer body and borer head is to be reduced or eliminated. This reduction in the transmission of solid-borne sound also leads to an improvement in the properties of the tool.

Such tools are especially suitable for transverse bores of considerable depth in workpieces. In addition, the tools are also suitable for bores having oblique bore exits.

In a first configuration, the supporting element is configured as a disk which is plane-parallel to the end faces, adjacent to one another, of borer body and borer head. This disk-shaped supporting element preferably projects like a sliding ring segment beyond the lateral surfaces of borer body and borer head and thus supports the boring tool relative to the bore wall. In this way, the course of the boring tool in the bore is stabilized, while the cutting edges in the borer head can machine the bore wall.

A further preferred embodiment of the supporting element has a ring-like integrally formed portion which overlaps the lateral surfaces either of the borer body or of the borer head or of borer body and borer head at the same time. This embodiment has the advantage that the supporting element bears like a sliding ring against a large area of the bore wall. In addition, in a bowl-like configuration of the supporting element having a basic body configured as a plane-parallel disk and an annular integrally formed portion, especially good mounting of the borer body and of the borer head in the coupling region is ensured. In a further configuration, recesses corresponding to the flutes formed in the borer body and in the borer head can be provided in the supporting element in order to optimize the chip removal. The comparatively large outer circumferential surface of the ring-like integrally formed portion on the supporting element enables the attachment of special guide elements for guiding the boring tool on the bore wall. These guide elements can be strip-shaped or bulged or can be designed in other geometries for improving the concentric running of the tool in the bore. These guide elements can be integrally embedded in the outer surface of the ring element. However, it is also possible to fix them in the ring element in a clamping manner.

In a further configuration, the supporting element can have a coating, in particular in the region of the ring-like integrally formed portion. This coating can serve to prevent the wear on the outer surface of the ring relative to the bore wall. The coating can also influence the other vibratory and transmission properties of the tool.

In a further embodiment of the invention, the ring-like integrally formed portion, in particular in the configuration as a receiving bowl, can at the same time be configured as a flexural spring. In this configuration, the ring element applies a spring force to the bore wall and thus counters drifting of the tool away from its centered position with the acting spring force. The tool is therefore resiliently guided on the bore wall. In this way, the supporting element forms a damping member for the tool relative to the workpiece to be machined.

BRIEF DESCRIPTION OF THE DRAWINGS

Exemplary embodiments of the invention are explained below in more detail with reference to the figures. In the drawing, partly in schematic illustration:

FIGS. 4a-c show a schematic plan view of the driver connection between the boring body and the boring head (FIG. 4a) of a second embodiment variant and cutaway sectional views along the section lines 4b-4b and 4c-4c, respectively, in FIG. 4a, FIG. 5 shows a schematic plan view of the driver connection of the first embodiment variant, FIG. 6 shows a schematic plan view of the driver connection similar to FIG. 4a and FIG. 5 of a third embodiment variant, FIG. 7 shows a perspective view of the driver region of the boring head according to the third embodiment variant, FIG. 8 shows a perspective plan view of the driver region of the boring body according to the third embodiment variant, FIG. 9a, b show a plan view (FIG. 9a) of the end face of the boring body and a sectional view through the borer head (FIG. 9b), the section plane being determined by the section line 9b-9b in FIG. 9a, FIG. 10 shows a perspective view of the driver connection of the borer head according to a fourth embodiment variant, FIG. 11 shows a schematic plan view of the driver connection according to a fifth embodiment variant which forms a combination of the third and fourth embodiment variants, FIG. 12 shows a perspective view of the driver region of the borer head according to a sixth embodiment variant.

Parts having the same effect are provided with the same designation in the figures. The driver connection is described below with reference to a boring tool in various embodiment variants. The driver connection can also be generally applied to other cutting tools for coupling two parts of a tool. The individual features described below with respect to the various variants and design configurations, provided they are not mutually exclusive, can also be combined with one another.

DETAILED DESCRIPTION OF THE INVENTION

Figure 1:
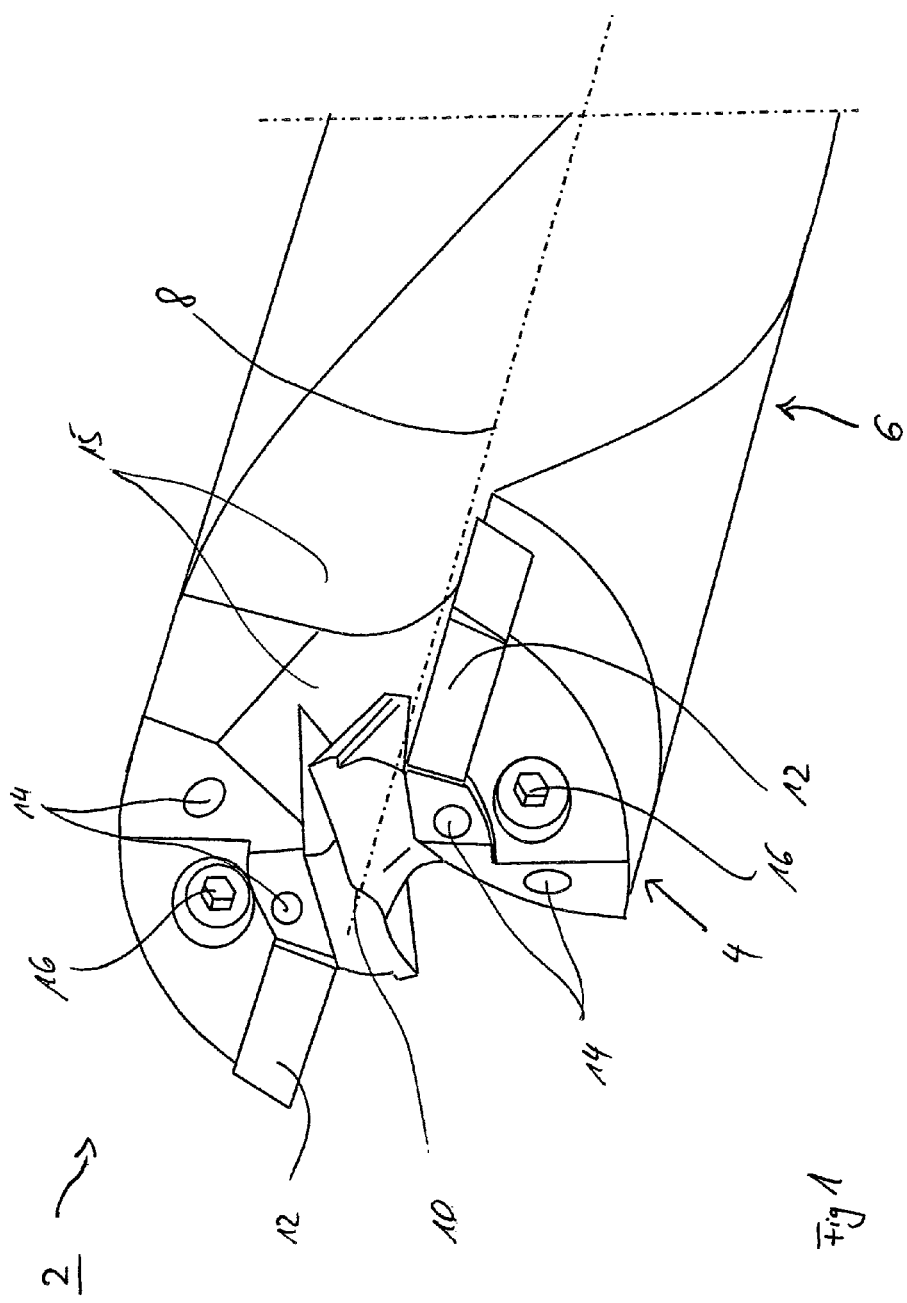
FIG. 1 shows a perspective cutaway illustration of a modular boring tool.

The boring tool 2 shown in FIG. 1 is of modular construction and comprises a borer head 4 which forms the front part and is interchangeably fastened to a borer body 6 forming the receiving part. The boring tool 2 extends in the axial or longitudinal direction along a center axis 8. In the exemplary embodiment, the borer head 4 has a central borer point 10 designed as a cutting insert and two cutting tips 12 arranged radially on the outside. A total of four discharge openings 14 for coolant can be seen on the front end face of the borer head 4. The cutting tips 12 are oriented with their free flat side toward a flute 15 which starts in the borer head 4 and is continued as a helical flute 15 in the borer body 6. The borer head 4 can be screwed to the borer body 6 by means of clamping screws 16 which are passed through the borer head 4 from the end face.

The borer head 4 and the borer body 6 are detachably fastened to one another via a driver connection.

Figure 2:
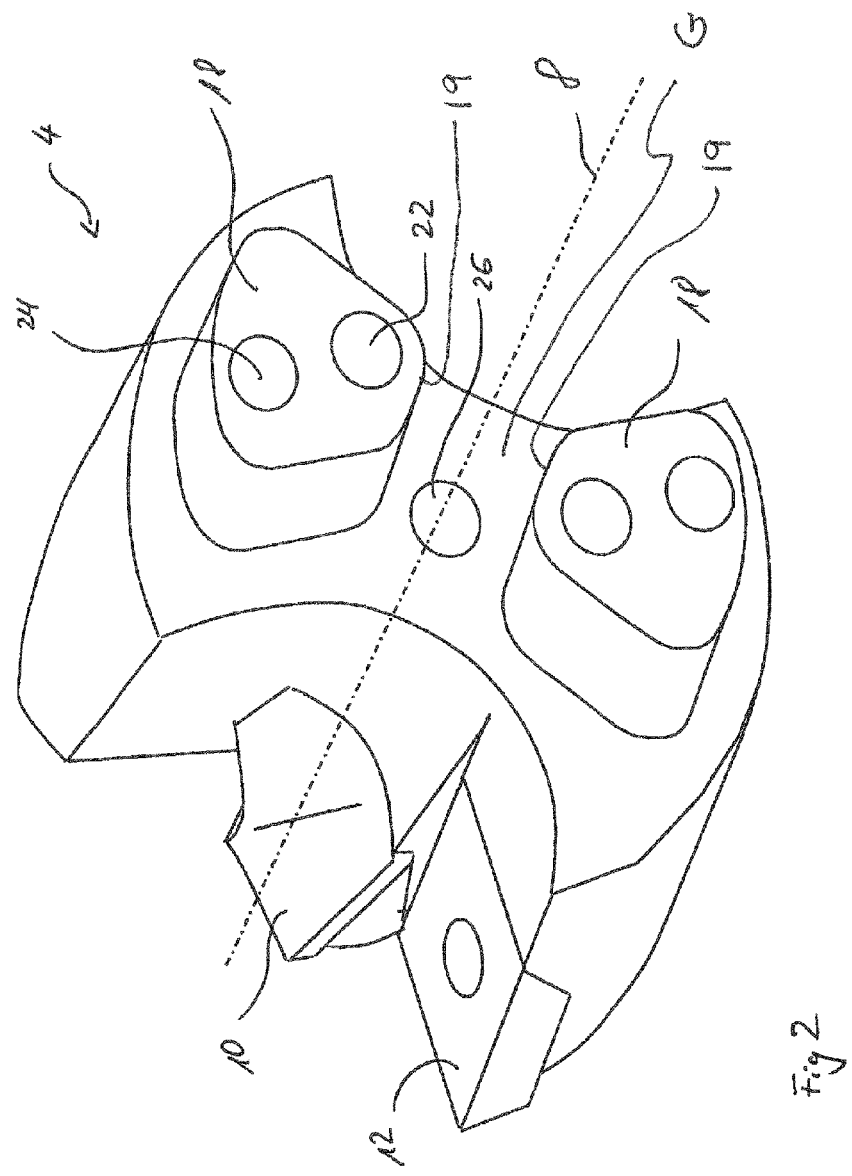
FIG. 2 shows a perspective view of the rear side of a boring head of the boring tool according to FIG. 1, having driver pins of a first embodiment variant.
Figure 3:
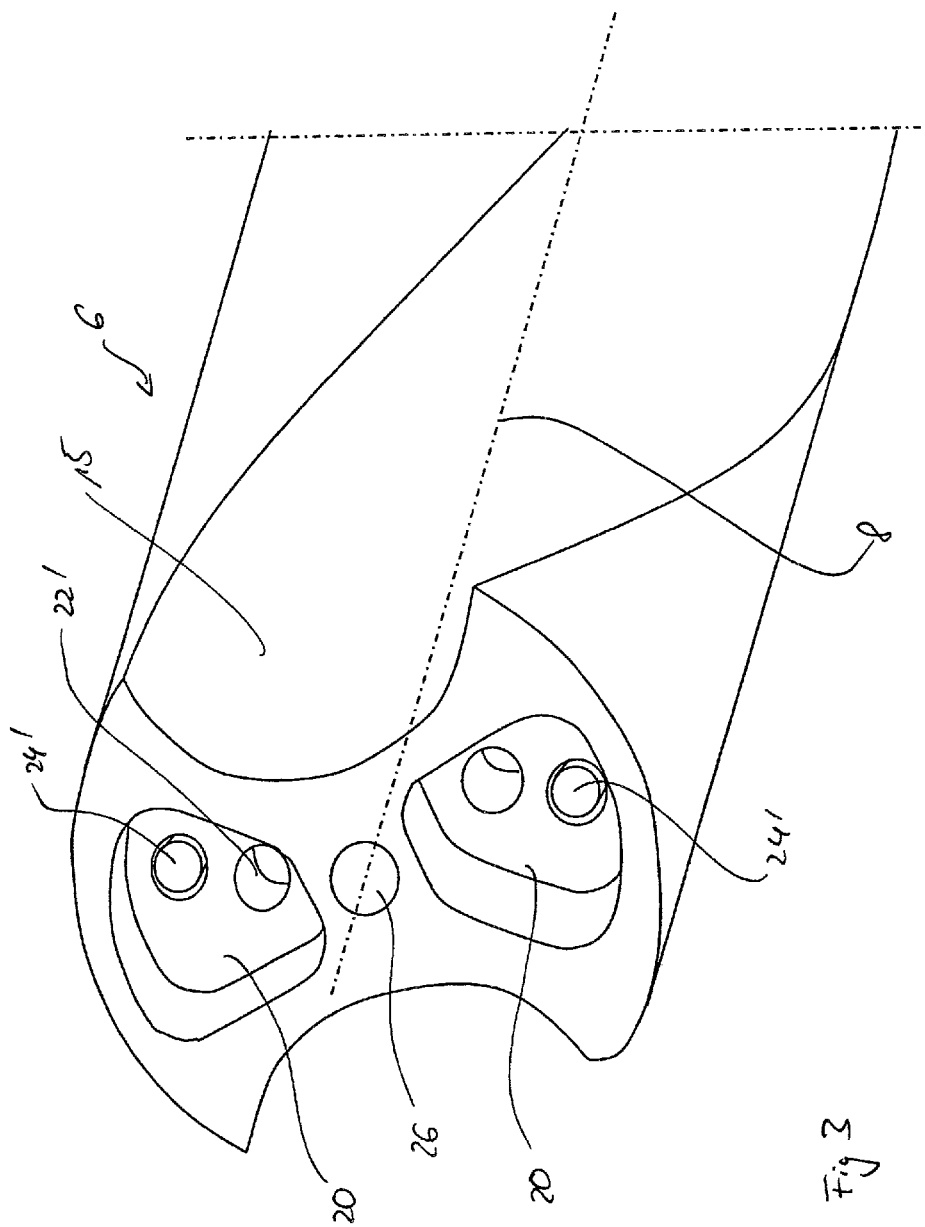
FIG. 3 shows a perspective plan view of the front end face of a boring body of the boring tool according to FIG. 1, having receiving pockets of the first embodiment variant.

As can be seen from FIGS. 2 and 3, the driver connection comprises two driver pins 18 which are arranged at a distance from one another on the underside of the borer head 4 and eccentrically to the center axis 8. In the assembled state, the driver pins engage in a respective, corresponding receiving pocket 20 of the borer body 6. The driver pins 18 are designed as prism-like prominences starting from the bottom flat side of the borer head 4. In the same manner, the receiving pockets 20 are designed as prism-like recesses starting from a flat end face of the borer body 6. A coolant bore 22 and a fastening bore 24 pass through each driver pin 18 and are in alignment with respective associated bores 22', 24' in the flat bottom surface of the receiving pocket 20. The coolant bores 22, 22' are fed from a central coolant passage 26 in a manner not shown in any more detail here.

Each driver pin 18 is defined by an end face which lies in a plane perpendicular to the center axis 8 and by a circumferential or lateral surface which is oriented parallel to the center axis. The respective receiving pockets 20 are also designed complementary hereto.

The separate configuration of the two driver pins 18 and the complete, enclosing reception thereof on all sides in the receiving pockets 20 is especially important. The driver pins 18 and the receiving pockets have a special geometry explained in more detail below. The cross-sectional area—perpendicular to the center axis—of each coupling element 18, 20 is characterized by asymmetry. This ensures very good torque transmission via the driver connection with the lowest possible stress of the boring body 6 in the region of the receiving pockets 20. At the same time, the driver pins 18 are formed and arranged in conjunction with the receiving pockets 20 in such a way that automatic self-centering of the two parts 4, 6 relative to one another is effected. Each of the driver pins 18 forms a coupling pair with the receiving pocket associated with it; the driver pins 18 and the receiving pockets 20 form coupling elements which are designed to be generally complementary to one another and which—except for the slight differences described below—have identical cross-sectional geometries.

As can be seen from FIG. 4a, each coupling element has an approximately polygonal cross-sectional contour (as viewed in a plane perpendicular to the center axis 8). In the exemplary embodiments, each coupling element 18, 20 has four corner regions which are each of rounded design. The coupling elements generally have a trapezoidal cross-sectional area in the exemplary embodiments. Respective wall sections are formed between the individual corner regions. FIG. 4a shows the driver connection in the loaded state, that is to say when the individual coupling elements 18, 20 bear against one another for the torque transmission. As can be seen from FIG. 4a, two respective wall regions bear against one another in this case. The one wall region is the radially outer wall region in which the coupling elements 18, 20 bear against one another via outer bearing surfaces 28 to transmit forces only in the tangential direction. The latter are of curved design and run, in the exemplary embodiment in FIG. 4a, concentrically to the outer circumferential side of the boring tool 2. Furthermore, the two coupling elements 18, 20 bear against one another with driver surfaces 30 adjacent to the bearing surfaces 28. In the exemplary embodiment in FIG. 4a, said driver surfaces 30 are arranged substantially radially to the center axis 8. The other two wall regions of the coupling elements each have clearance relative to one another, such that the driver pins 18 overall rest with clearance in the respective receiving pocket 20. These other wall regions therefore do not have any function with respect to the torque transmission and also do not serve to center the two parts 4, 6 relative to one another. In the exemplary embodiment, these wall regions are oriented approximately perpendicularly to one another and run parallel to and at a distance from two respective planes which are likewise arranged at a right angle to one another and which each include the center axis 8. As seen in FIG. 2, the driver pin wall regions 19 closest to the center axis 8 oppose one another and define a free space or gap G therebetween.

As can be seen from the sectional illustration of FIG. 4b, the two coupling elements 18, 20 bear directly against one another in the region of their driver surfaces 30. At the same time, it can be seen that the borer head 4, with its flat underside, rests flat on the flat end face of the borer body 6. In contrast, the underside of the driver pin 18 is at a distance from the bottom surface of the receiving pocket 20. Finally, it can also be seen from FIG. 4c that the rear wall regions, not participating in the torque transmission, of the two coupling elements 18, 20 are at a distance from one another.

When the borer head 4 is being fitted onto the boring body 6, first of all the driver pins 18 are inserted into the receiving pockets 20. The borer head 4 is then rotated slightly relative to the borer body 6, the borer head 4 and the borer body 6 being clamped together via the coupling elements 18, 20 on account of this relative rotation. In FIG. 5, to explain this action, the coupling pair is shown in the unclamped state in the left half of the figure and in the clamped state in the right half of the figure. Shown in FIG. 5 is the embodiment variant as can also be seen in FIGS. 2 and 3.

The radii of curvature $r_1$, $r_2$ of the outer bearing surfaces 8 of the driver pin 18 ($r_1$) and of the receiving pocket 20 ($r_2$), respectively, are depicted in FIG. 5. As can be seen, the centers of the radii of curvature are arranged offset from one another, such that the driver pins 18 overall are arranged eccentrically to the receiving pockets 20. The outer bearing surfaces 28 corresponding to one another are radially clamped against one another during the rotary movement by this measure. On account of the 180° symmetry of the two coupling pairs in the exemplary embodiment, the automatic centering of the borer head 4 relative to the borer body 6 is effected during this rotary movement. In the process, the coupling elements 18, 20 can be rotated relative to one another by a free rotation angle α which is in the region of a few degrees, in the region of 2° in the exemplary embodiment.

Except for this eccentric configuration, the two coupling elements 18, 20 are identical, i.e. they are designed with the same cross-sectional geometry. To form the clearance, which can readily be seen from the left half of FIG. 5, the driver pins are merely designed to be somewhat smaller than the receiving pockets.

Whereas in the exemplary embodiment in FIG. 4a the driver surfaces 30 run inward in a concavely arched manner toward the radially inner corner region, the driver surfaces 30 according to the exemplary embodiment in FIG. 5 extend substantially rectilinearly, wherein they deviate at an angle of a few degrees from the radial line which runs through the center axis 8.

The third embodiment variant shown in FIG. 6 is based on the embodiment variant according to FIG. 5. Here, too, the left half of the figure shows the unclamped state and the right half of the figure shows the clamped state. In contrast to the exemplary embodiment in FIG. 5, a compensating element 32 is arranged in the corner region which connects the driver surfaces 30 to the outer bearing surfaces 28. The compensating element is designed like a dowel pin, extends parallel to the center axis 8 and has a circle-segment-like area as viewed in cross section. On account of the compensating element 32, that corner region of the driver pin 18 which relates thereto is of flattened design, as can best be seen from FIG. 7. At its rear end, the compensating element 32 has a cylindrical fastening shank 34, with which it is inserted into a cylindrical shank receptacle 36 (FIG. 8) in the bottom of the receiving pocket 20. The compensating element 32 is rotatable about its longitudinal axis in the shank receptacle 36.

The compensating element 32 is arranged in the loaded region of the coupling elements 18, 20, namely between the driver surfaces 30 and the outer bearing surfaces 28. The driver pin 18 is supported with its flattened corner region against the flat side of the compensating element 32 and the latter in turn is supported with its approximately semi-cylindrical, rounded lateral surface side against the corner region of the receiving pocket. In this case, the corner region has the same radius as the compensating element 32. On account of the rotatability of the compensating element 32 and on account of the design flattened on the one side and rounded on the other, the compensating element adapts itself automatically to the flat side of the driver pin 18, such that planar contact is formed between driver pin 18 and compensating element 32. On account of the rounded design with which the compensating element 32 bears against the wall of the receiving pocket 20, largely planar contact is formed here, too. Overall, therefore, the compensating element 32 serves for compensating for tolerances which are caused during production, for example, or also form in the course of operation. In order to prevent the compensating element 32 from falling out, said compensating element 32 can be fixed in the shank receptacle 36 by means of a fastening lacquer, for example. The fixing force is proportioned in such a way that, in the load case and during a requisite rotation for compensating for tolerances, the compensating element 32 rotates automatically into the optimum position.

The borer head 4 is fastened to the borer body 6 via an additional clamping mechanism, such that the borer head is clamped against the borer body 6 in a defined axial position and in a defined rotary position in the clamping or circumferential direction.

Figure 9A:
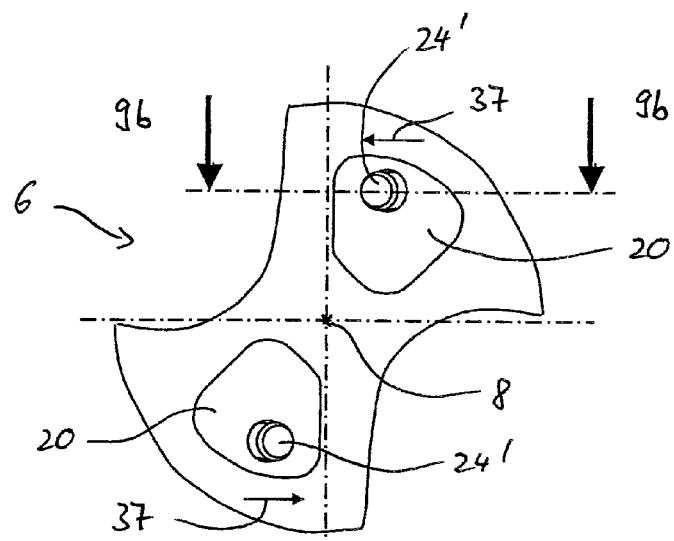
Figure 9B:
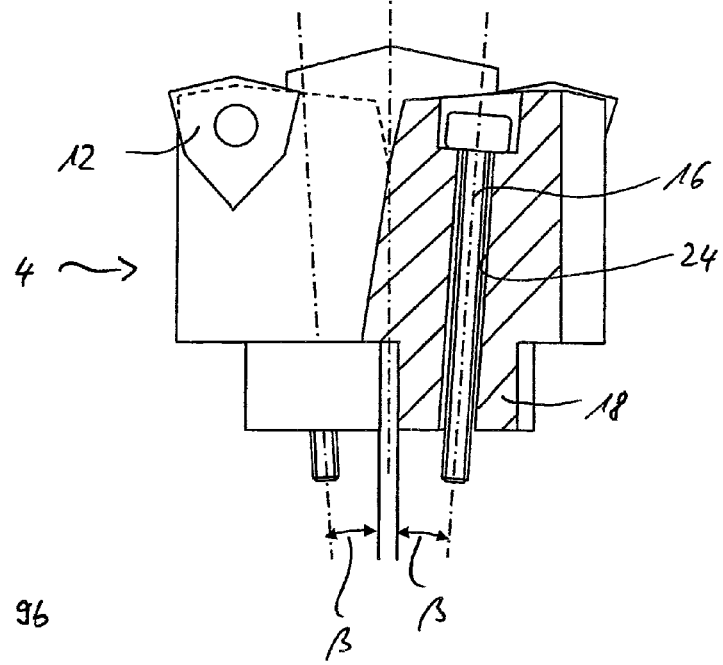

According to a first embodiment variant, which is explained with reference to FIGS. 9a, 9b, a clamping screw 16 is passed through the borer head 4 from the front end face of the borer head 4, and this clamping screw 16 runs through the fastening bore 24 of the driver pin 18 and can be screwed into an associated fastening bore 24', designed as a screw hole, in the receiving pocket 20. The fastening bores 24, 24' are not arranged parallel to the center axis 8 but rather are arranged in an inclined manner. In this case, the center axis of the fastening bore 24 runs within a plane. This plane is defined by the axial direction and a clamping direction which is indicated in FIG. 9a by the arrow 37. The clamping direction 37 is in this case defined by the direction in which the driver pin 18 is clamped against the receiving pocket 20. The clamping direction is in this case preferably oriented perpendicularly to the driver surface 30. With regard to a line running in this plane parallel to the center axis 8 (and thus with regard to the driver surfaces 30), the center axis of the fastening bore is inclined by an inclination angle β of >1° within the range of 3°-20° and preferably within the region of about 10°. On account of this sloping orientation, the borer head 4 is clamped against the borer body 6 both in the axial direction and in the clamping direction 37.

As an alternative to this clamping, running substantially in the longitudinal direction, through the tool head 4 by means of the clamping screw 16, a lateral clamping device is provided according to a preferred alternative. Said clamping device can be actuated from the circumferential side of the borer body 6. The special advantage can be seen in the fact that no through-bores, weakening the borer head 4, for the clamping screw 16 have to be provided. This lateral clamping device is explained in more detail below in connection with FIGS. 10 to 14 in two different embodiment variants.

In the first embodiment variant, which is explained with reference to FIGS. 10 and 11, the clamping device comprises a headless setscrew 38 which can be adjusted in a corresponding tapped hole in the respective driver pin 18 by means of a tool 40. To this end, the respective driver pin 18 has a through-hole 42 which is provided with an internal thread (not shown in any more detail here) at least in one section. The headless setscrew 38 has a receptacle 44 for the tool 40 on its rear end face accessible from outside, said receptacle 44 being designed as a hexagon socket in the exemplary embodiment (FIG. 10). A dog point 46 is integrally formed on its opposite end face. For clamping the two coupling elements, the headless setscrew 38 is unscrewed slightly from the through-hole 40, such that the headless setscrew 38 is supported with a section of its rear end face against the wall region of the receiving pocket 20 and therefore clamps the driver pin 18 in the desired direction. The headless setscrew 38 is designed roughly in a spherical cap shape at its rear end face. Complementary hereto, the wall region of the receiving pocket 20 is also designed in a spherical cap shape, such that, in addition to the clamping approximately in the circumferential direction, clamping in the axial direction is also effected.

For a change of the borer head 4, the headless setscrew is screwed in until the dog point 46 is supported against the opposite wall region of the receiving pocket 20 and thus the clamping between the coupling elements is released again, such that the borer head 4 can be removed.

A further feature concerning the compensating element 32 can additionally be seen from FIG. 11. To be precise—as can be seen from the left half of the figure—the corner region in which the compensating element 32 is arranged is formed by a corner hole in the receiving pocket 20 in such a way that there is as far as possible free rotatability of the compensating element in order to achieve the greatest possible planar contact between the flat sides of the driver pin 18 and the compensating element 32.

Figure 13:
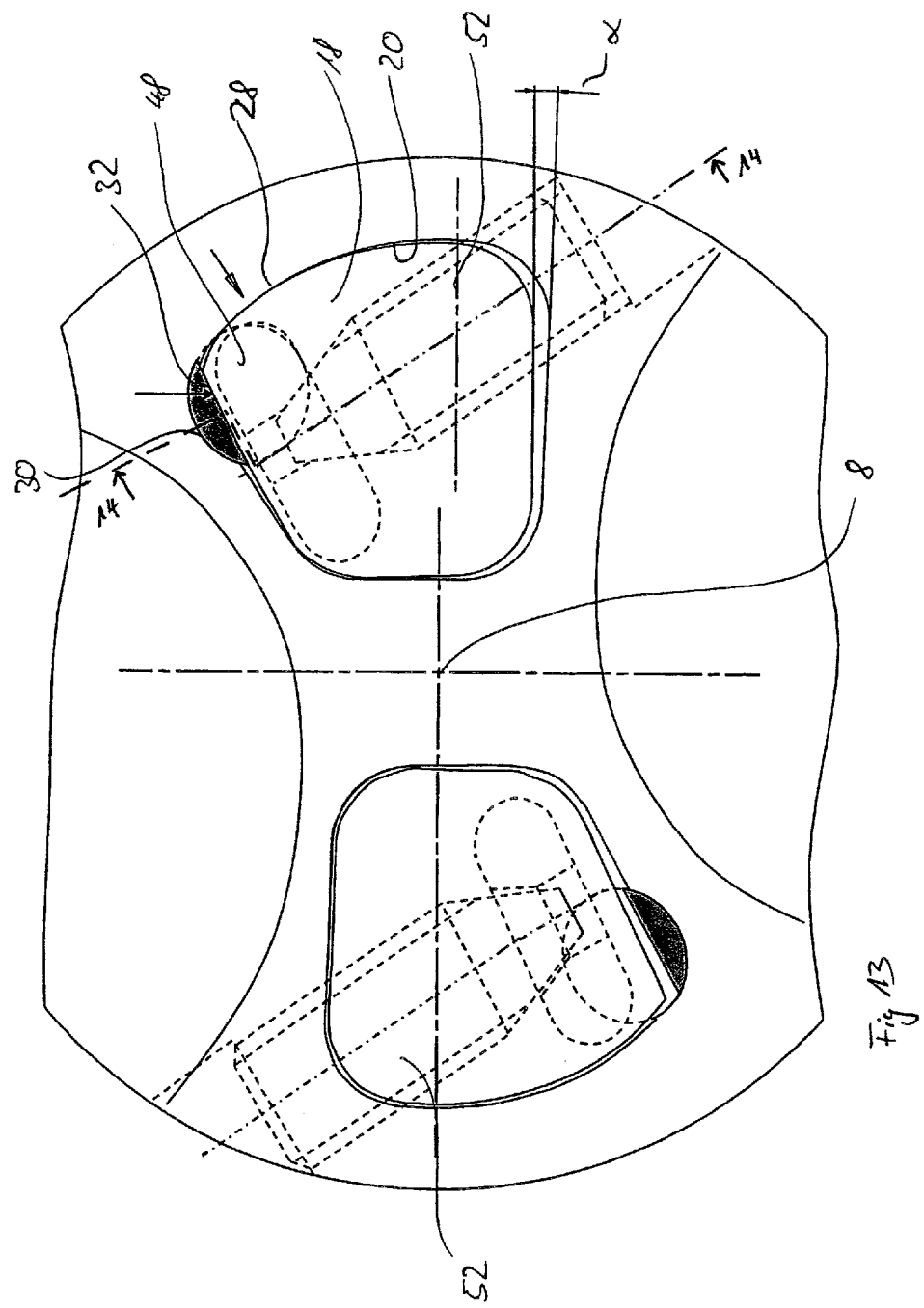
FIG. 13 shows a schematic plan view of the driver connection according to the sixth embodiment variant.

The second embodiment variant of the clamping device will now be explained in more detail with reference to FIGS. 12 to 14. In FIG. 13, the unclamped state between the two coupling elements is again indicated in the left half of the figure and the clamped state is indicated in the right half. In this embodiment variant, the driver pin 18 additionally comprises a respective clamping pin 48 which extends in the axial direction starting from the base side. In the exemplary embodiment, the clamping pin 48 has a roughly rectangular to elliptical cross-sectional contour and is arranged eccentrically on a marginal side.

Figure 14:
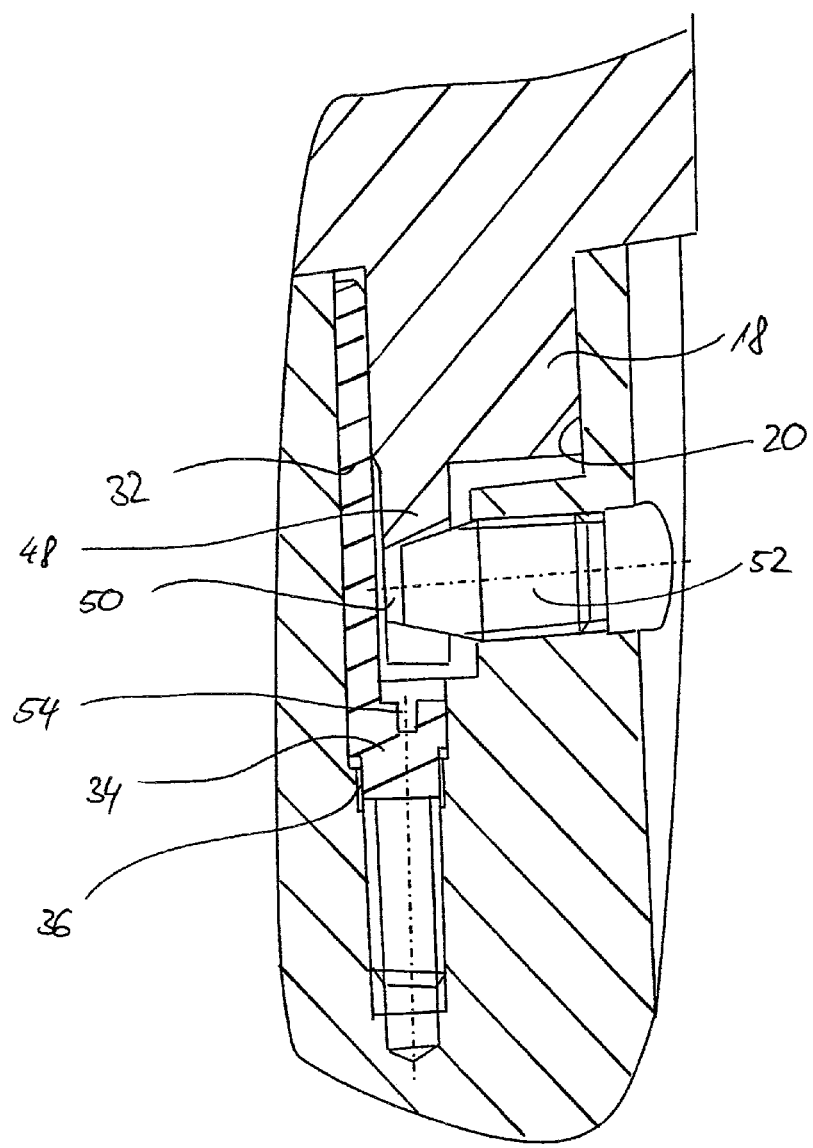
FIG. 14 shows a partial sectional view in the region of a clamping pin according to the sixth embodiment variant along section line 14-14 in FIG. 13.

The clamping pin 48 has a frustoconical receiving opening 50 in which a clamping element 52 designed as a screw and having a likewise frustoconical point engages (FIGS. 13 and 14). Due to the frustoconical, that is to say tapering, configuration of the receiving opening 50 and of the clamping element 52, an axial force component is also generated at the same time, in addition to the clamping in the circumferential direction, for clamping the borer head 4 in the axial direction against the boring body 6.

The generation of the force in the axial direction on account of the frustoconical configurations can be readily seen once again from FIG. 14. Furthermore, a slot-shaped recess 54 on the top end face of the fastening shank 34 of the compensating element 32 can be seen from this figure. This slot-shaped recess 54 permits the engagement of, for example, a screwdriver in order to be able to rotate the compensating element into the desired position during the initial assembly.

Figure 15:
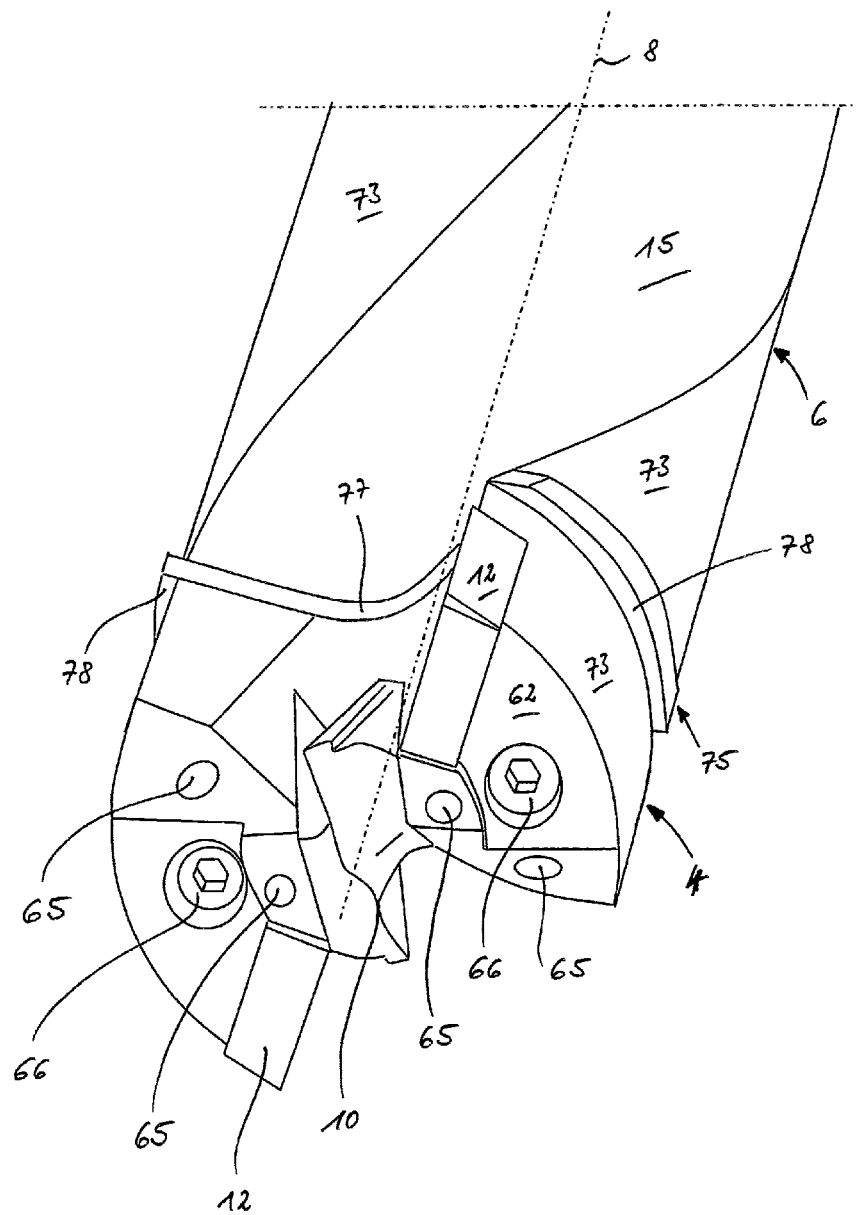
FIG. 15 shows an overall view of a section of a first embodiment of the boring tool with supporting element.

The borer head 4 in FIG. 15 has, on its cutting side 62, the boring point 10 and two cutting tips 12 opposite one another at the circumference. Furthermore, coolant passages 65 and fastening means 66 are provided in the region of the borer head 4. The fastening means 66 serve, for example, to fasten the cutting tips 12 or to fasten cutting tip holders or the like.

The head coupling side 67 is remote from the cutting side 62 of the borer head 4. The head coupling side 67 has that end face of the borer head 4 which faces the borer body 6. From this end face on the head coupling side 67, in the exemplary embodiment, two driver pins project from the head coupling side 67 in the direction of the borer body 6. The driver pins 18 again also have the rear openings of the coolant passages 65.

That side of the borer body 6 which faces the borer head 4 is the shank coupling side 70. The shank coupling side 70 and the head coupling side 67 form the coupling region between borer body 6 and borer head 4. Two receiving pockets 20 designed to be complementary to the driver pins 18 are formed in the surface of the shank coupling side 70. Coolant passages 65 can again be seen in the receiving pockets 20, said coolant passages 65 being in alignment with the coolant passages 65 in the borer head 4 in the final assembled state. The coolant passages 65 therefore pass through the entire boring tool. Finally, both the borer head 4 and the borer body 6 each have a centering bore 72. Flanks 73 on the borer head 4 and on the borer body 6 and helical flutes 15 incorporated between the flanks 73 can also be seen.

The tool mounting end (not shown in the figures) of the borer body 6 is remote from the shank coupling side 70 on the borer body 6. With the tool mounting end, the borer body 6 is clamped in place in the boring tool.

Figure 16:
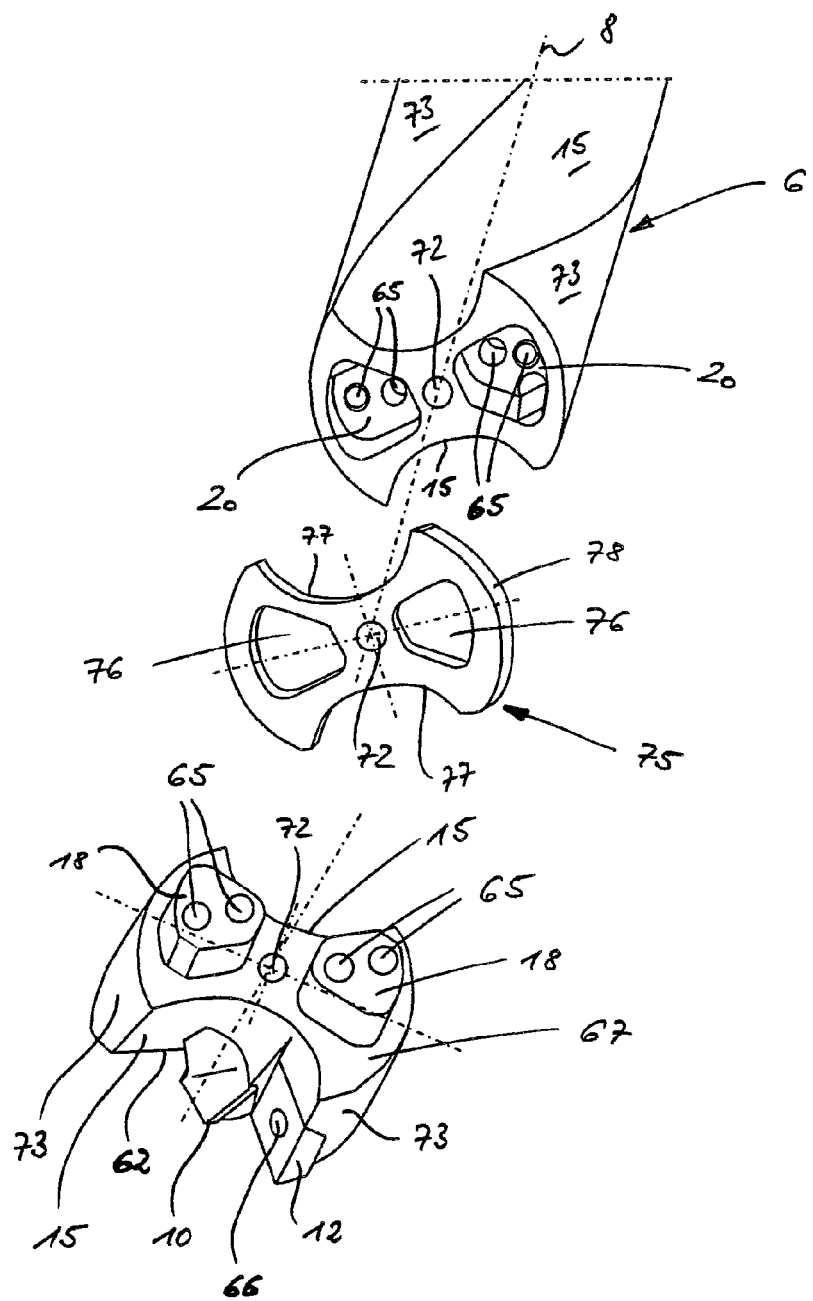
FIG. 16 shows an exploded illustration of the boring tool shown in FIG. 15.
Figure 17:
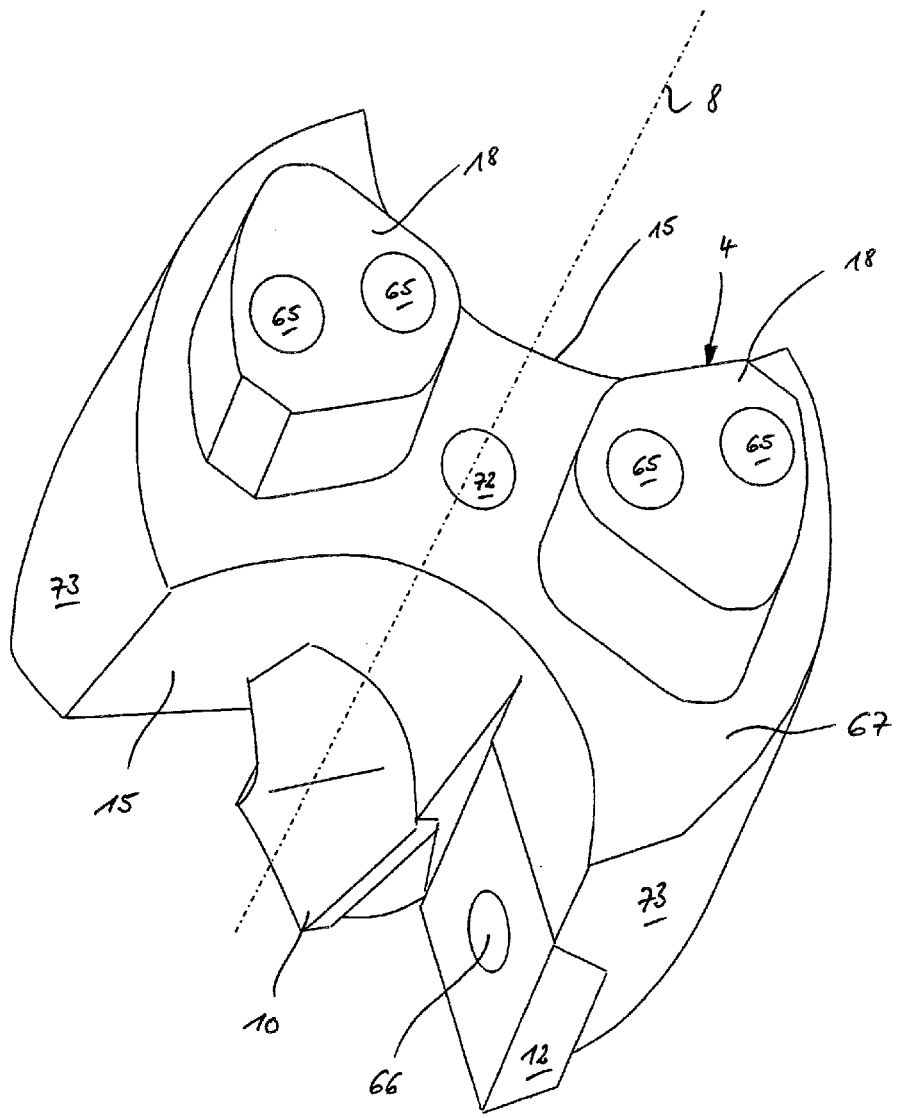
FIG. 17 shows a view of the coupling surface of the borer head according to FIG. 15.
Figure 18:
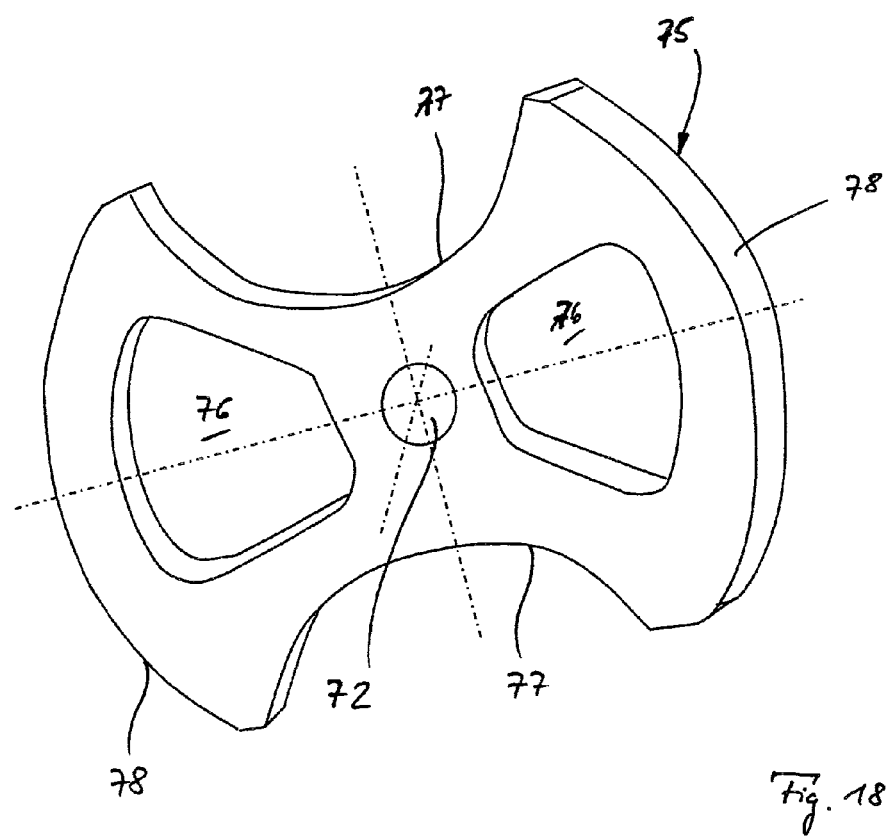
FIG. 18 shows a view of a supporting element according to FIG. 15 designed as a plane-parallel disk.
Figure 19:
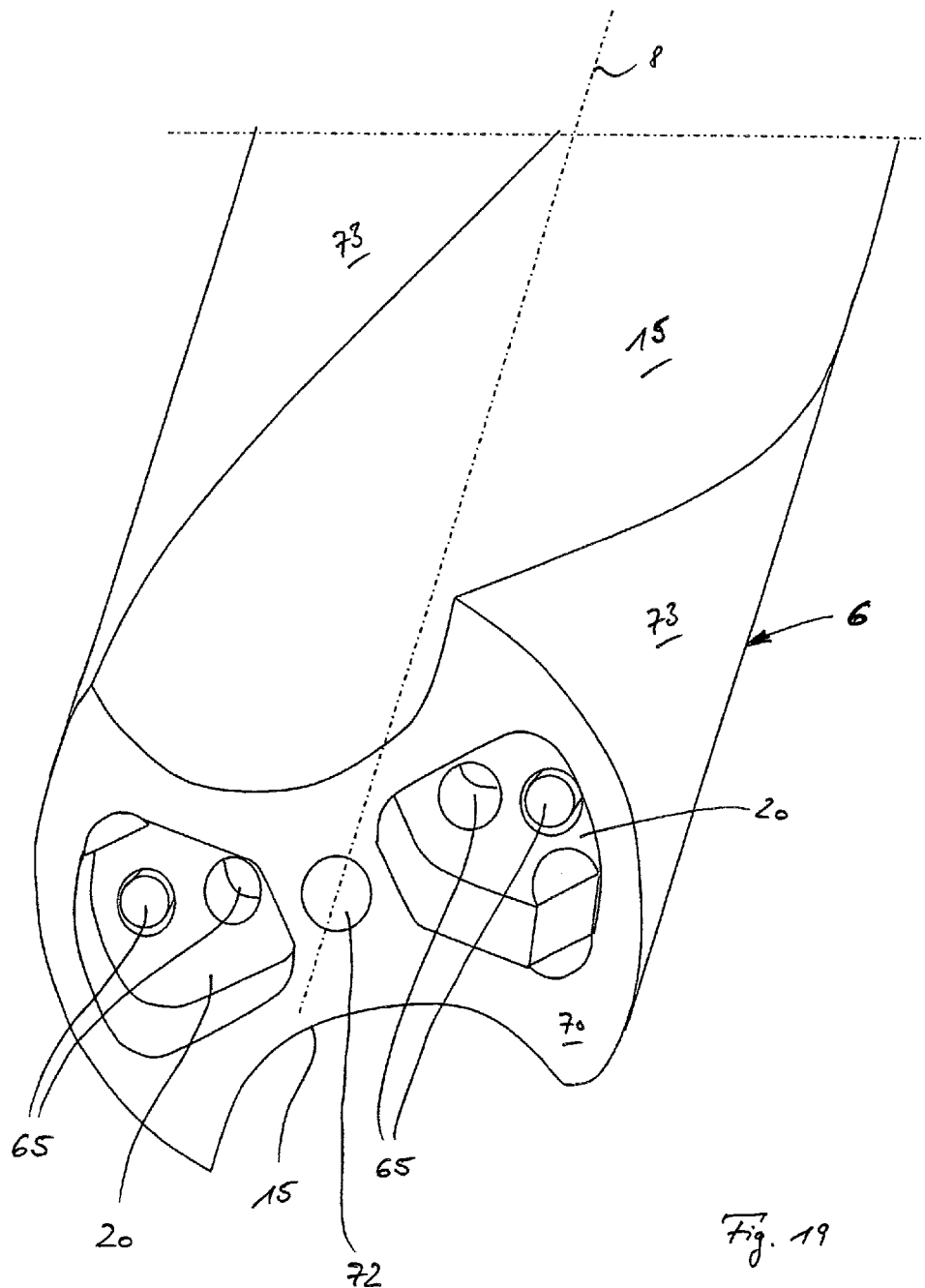
FIG. 19 shows a plan view of the coupling surface of the borer body from FIG. 15.

In the exemplary embodiment according to FIG. 15 and FIG. 16, the supporting element 75 designed as a plane-parallel plate is arranged between the borer head 4 and the borer body 6. The supporting element 75 has through-openings 76 corresponding to the outer contour of the driver pins 18. By means of the through-openings 76, the supporting element 75 is slipped onto the borer head 4 in a simple manner, the driver pins 18 passing through the supporting element 75 in the through-openings 76. The driver pins 18 thus form a form fit with the supporting element 75. For the final assembly, shown in FIG. 15, of the tool, the driver pins 18 first of all pass through the through-openings 76 in order to then engage in the receiving pockets 20 in the borer body 6 in a form-fitting manner. The supporting element also has a centering bore 72. Furthermore, the supporting element 75 has recesses 77 corresponding with the flutes 15.

It can be seen from the illustration in FIG. 15 that the supporting element 75 projects beyond the lateral surface, formed by the flanks 73, of the borer head 4 and of the borer body 6. In the finally assembled boring tool, the supporting element 75 therefore forms a protruding annular region 78 which projects beyond the envelope surface of the boring tool, namely of the borer head 4 and of the borer body 6. During the boring operation, the supporting element 75 bears with this annular region 78 against the bore wall and thus guides the tool relative to the bore wall.

Figure 20:
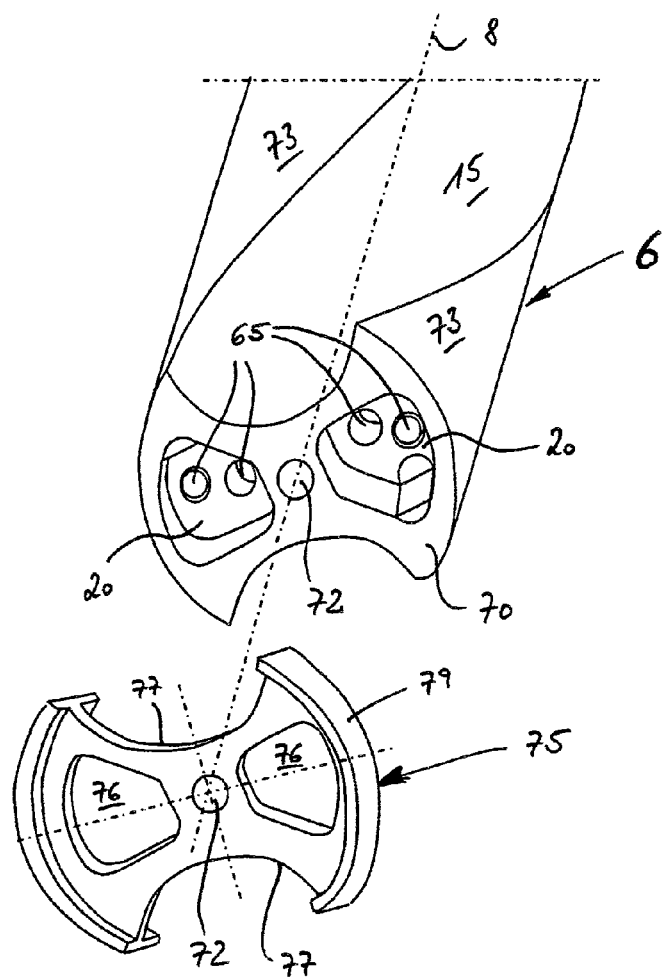
FIG. 20 shows the exploded illustration of a borer body and of a supporting element having a two-sided receiving bowl.

The exploded illustration in FIG. 20 shows a borer body identical to FIGS. 15 to 19. In the exemplary embodiment according to FIG. 20, the supporting element 75 has a ring-like integrally formed portion 79. The integrally formed portion 79 overlaps both the head coupling side 67 of the borer head 4 and the shank coupling side 70 of the borer body 6 in the direction of the center axis 8 of the boring tool. The supporting element 75 shown in FIG. 20 therefore forms a two-sided receiving bowl for receiving both the head coupling side 67 of the borer head 4 and the shank coupling side 70 of the borer body 6.

Figure 21:
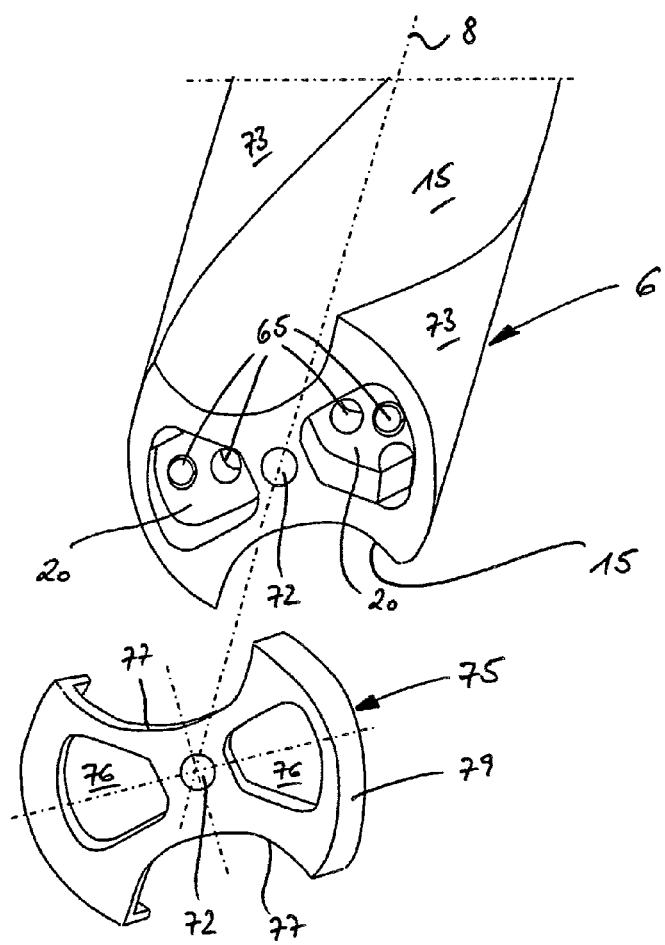
FIG. 21 shows the exploded illustration from FIG. 20 having a supporting element with a receiving bowl effective in the direction of the borer body.

In contrast thereto, the exemplary embodiment of the supporting element 75 shown in FIG. 21 has only one annular integrally formed portion 79, which extends in the direction of the center axis 8 of the boring tool toward the shank coupling side 70 of the borer body 6. In other words, the annular integrally formed portion only overlaps the shank coupling side 70 of the borer body 6 and at the same time bears as a plane-parallel plate against the head coupling side 67 of the borer head 4.

In contrast thereto, the annular integrally formed portion 79 in the exemplary embodiment shown in FIG. 20 overlaps both the shank coupling side 70 of the borer body 6 and the head coupling side 67 of the borer head 4 and thus forms a double-sided receiving bowl for both the shank coupling side 70 of the borer body 6 and the head coupling side 67 of the borer head 4. The exemplary embodiment according to FIG. 21, on the other hand, forms only one receiving bowl for the borer body 6, namely the shank coupling side 70 of the borer body 6.

Figure 22:
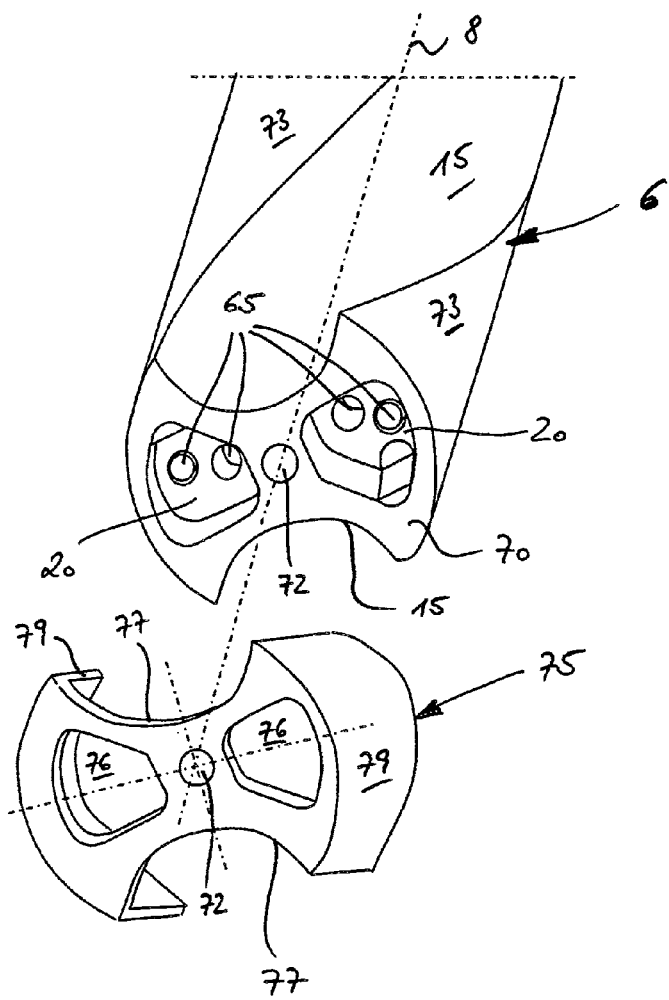
FIG. 22 shows an exemplary embodiment, modified compared with the exemplary embodiment shown in FIG. 21, of a supporting element with an enlarged receiving bowl.

The exemplary embodiment shown in FIG. 22 again shows a supporting element 75 having a receiving bowl which is effective only with regard to the borer body 6 and a plane-parallel plate bearing against the borer head 4. In contrast to the exemplary embodiment shown in FIG. 21, the annular integrally formed portion 79 overlaps the shank coupling side 70 of the borer body 6 by a considerably greater amount in this exemplary embodiment. When the tool is assembled, the extent of the integrally formed portion 79 in the direction of the center axis 8 is considerably greater than in the exemplary embodiment shown in FIG. 21. In this way, it is possible to arrange guide elements 81 on the annular integrally formed portion 79.

Figure 23:
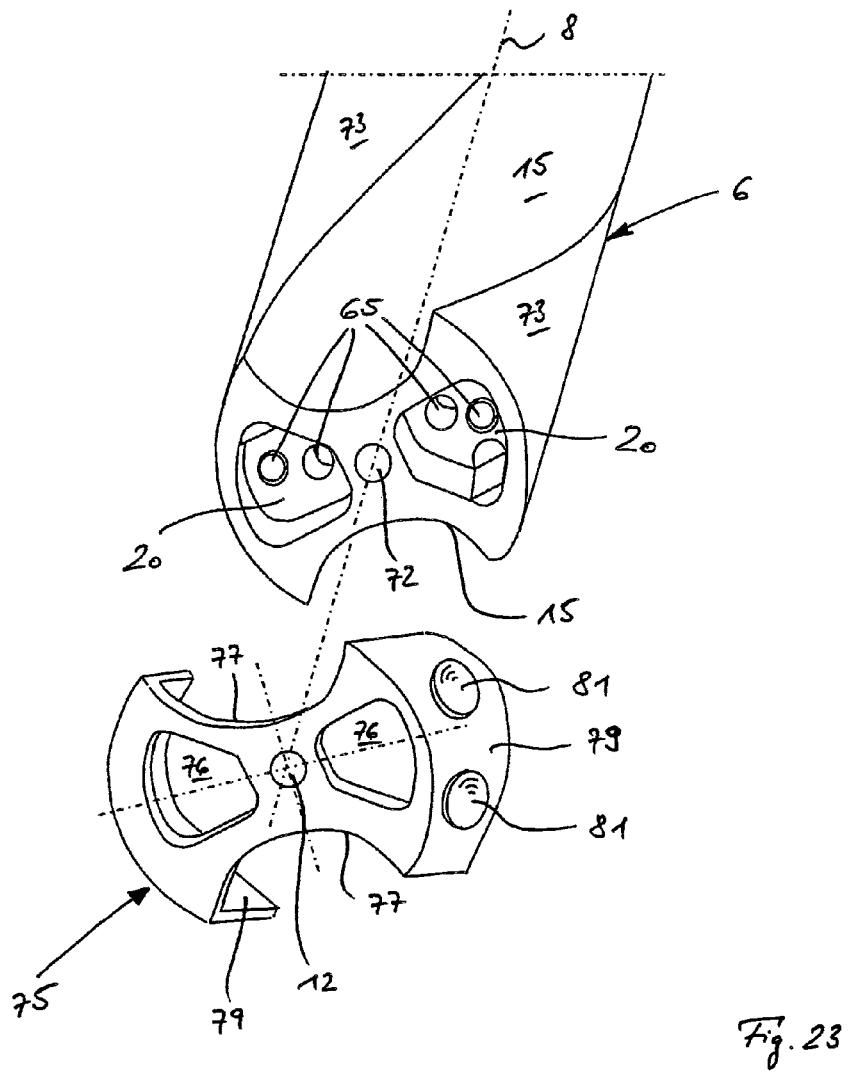
FIG. 23 shows an embodiment of the supporting element having guide elements on the outer circumferential surface of the annular integrally formed portion.

The exemplary embodiment shown in FIG. 23 shows, as an example of such guide elements 81, guide studs attached in pairs to the annular integrally formed portion 79. These guide elements 81 slide on the bore wall during the machining process.

Figure 24:
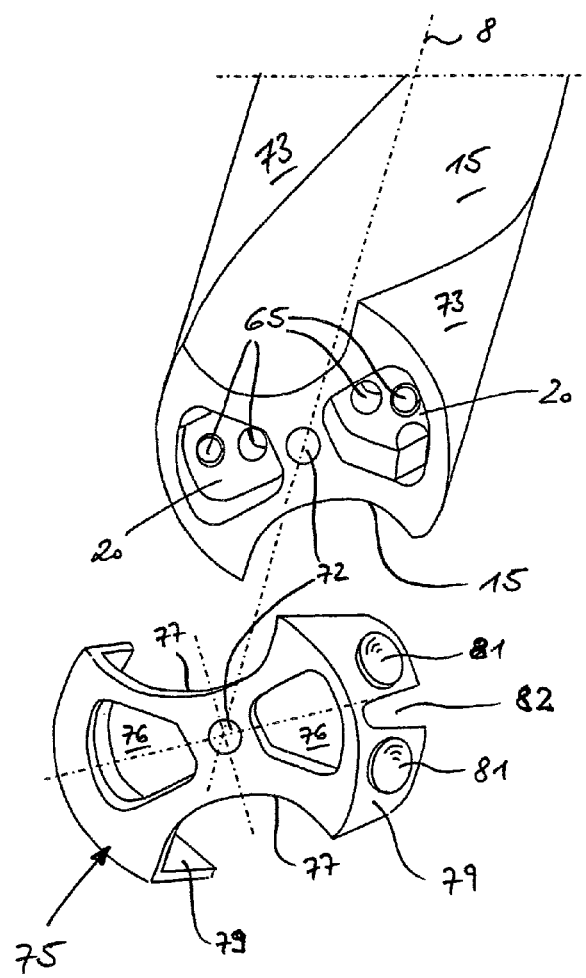
FIG. 24 shows an embodiment of an annular integrally formed portion configured as a flexural spring and as a receiving bowl.
Figure 25:
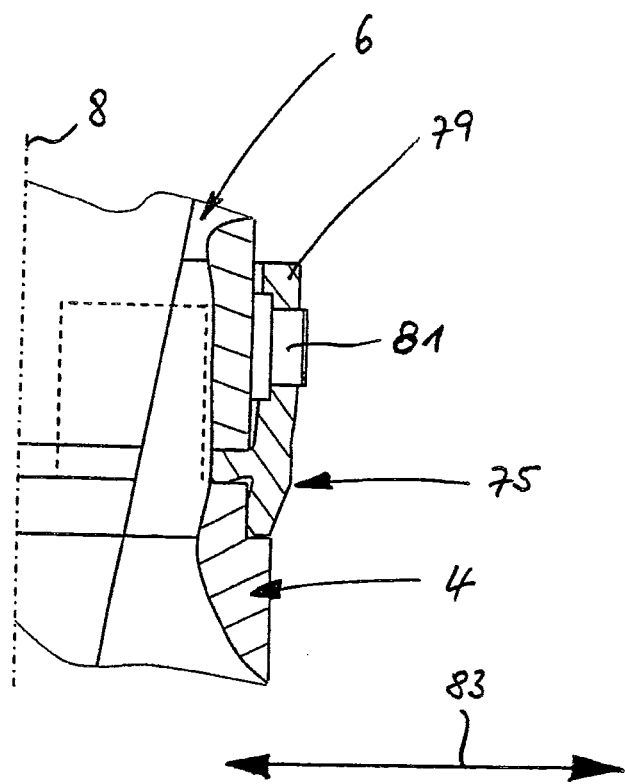
FIG. 25 shows a section through the ring-like integrally formed portion shown in FIG. 24 and configured as a flexural spring.

The exemplary embodiment shown in FIG. 24 again shows a supporting element 75 having a receiving bowl effective only in the direction of the borer body 6. In this case, the annular integrally formed portion 79 is configured as a flexural spring. For this purpose, a spring slot 82 is made in the annular integrally formed portion 79. Furthermore, it can be seen from the illustration in FIG. 25 that the guide elements 81 are pushed from the borer body 6 into the annular integrally formed portion 79. On account of its spring action, the annular integrally formed portion 79 is resiliently mounted on the boring tool in the transverse direction 83 running transversely to the center axis 8. The supporting element 75 is thus designed as a flexural spring element.

It is of course possible for all the embodiments in FIG. 21 to FIG. 24, with regard to the configuration of the supporting element 75 as a receiving bowl in relation to the borer body 6, to also be equally applied to the borer head 4. Configurations are also conceivable in which a receiving bowl acting on both sides overlaps not only the shank coupling side 70 of the borer body 6 but also a smaller region of the head coupling side 67 of the borer head 4.

The invention claimed is:

1. A rotating boring tool for machining comprising a receiving part and a front part which extend along a center axis and can be detachably fastened to one another via a driver connection, wherein the driver connection comprises at least two coupling pairs separate from one another about the center axis and arranged eccentrically with respect to the center axis, wherein each coupling pair is formed by interlocking coupling elements, namely a receiving pocket and a driver pin, wherein the driver pin has wall regions therearound,
   a) wherein the coupling elements are designed in such a way that the receiving part and the front part are oriented in alignment with one another via the coupling elements when said receiving part and said front part are fitted together,
   b) wherein the pin and pocket of each coupling element have an asymmetrical cross-sectional area and widen with increasing distance from the center axis,
   c) wherein the pins and pockets of the coupling elements, for assembly, have clearance relative to one another and different cross-sectional geometries in such a way that each pin is radially clamped against a pocket and loaded only in a tangential direction during a relative rotation of the coupling element,
   d) wherein in the clamped position, the two parts are self-centered; and
   e) wherein the driver pin wall regions closest to the center axis oppose one another and define a gap therebetween.

2. The tool as claimed in claim 1, wherein the driver pin is designed like a prism.

3. The tool as claimed in claim 1, wherein the coupling elements comprise radially outer bearing surfaces and further driver surfaces.

4. The tool as claimed in claim 3, wherein each receiving pocket has an outer web which comprises the outer bearing surface and widens, such that the radii of the outer bearing surface decreases, in the direction of those regions of the outer bearing surface which when loaded cause the outer bearing surfaces of the driver pin and the receiving pocket to clamp against one another.

5. The tool as claimed in claim 3, wherein the outer bearing surfaces come to bear against one another during the relative rotation.

6. The tool as claimed in claim 1, wherein the receiving pocket comprises at least one elastic wall region in such a way that, when loaded, surface contact is formed between the elastic wall region and an associated surface section of the driver pin.

7. The tool as claimed in claim 1, wherein the clearance is selected in such a way that the two coupling elements have a free rotation angle within the range of 1-5°.

8. The tool as claimed in claim 1, wherein the driver pin has at least one bore which is in alignment with a corresponding bore in the receiving pocket.

9. The tool as claimed in claim 8, wherein the at least one bore is provided for receiving a clamping screw, wherein the bore, as viewed in the circumferential direction, is oriented obliquely to a line parallel to the center axis in such a way that the two coupling elements are clamped against one another when the clamping screw is tightened.

10. The tool as claimed in claim 1, wherein a compensating element is arranged between the receiving pocket and the driver pin, said compensating element bearing against both the driver pin and the receiving pocket in a flat plane, wherein the compensating element is rotatable about its longitudinal axis.

11. The tool as claimed in claim 10, wherein the compensating element has a circular cross-section.

12. The tool as claimed in claim 10, wherein the compensating element has a fastening shank, with which it is inserted into a shank receptacle in the receiving pocket.

13. The tool as claimed in claim 10, wherein the compensating element and at least one of the coupling elements are made of materials of different hardness.

14. The tool as claimed in claim 1, wherein a clamping device is provided which can be actuated laterally relative to the center axis and via which the driver pin can be clamped together with the receiving pocket.

15. The tool as claimed in claim 14, wherein a longitudinally extending clamping pin is arranged on the driver pin, said clamping pin plunging into a pin receptacle of the receiving pocket, and wherein a clamping element is provided which acts on the clamping pin in order to clamp the driver pin together with the receiving pocket.

16. The tool as claimed in claim 14, wherein the clamping device has an element which is adjustably mounted in one of the coupling elements and which is supported with one of its end faces against the other coupling element for the clamping.

17. A multi-piece boring tool composed from at least one borer body and a borer head which can be coupled thereto, wherein the borer body and the borer head extend along a center axis and can be detachably fastened to one another via a driver connection, wherein the driver connection comprises at least two coupling pairs separate from one another and arranged eccentrically with respect to the center axis, wherein each coupling pair is formed by interlocking coupling elements, namely a receiving pocket and a driver pin, wherein the coupling elements are designed in such a way that the borer body and the borer head are oriented in alignment with one another via the coupling elements when the borer body and the borer head are fitted together, wherein the pin and the pocket of each coupling element have an asymmetrical cross-sectional area and widen with increasing distance from the center axis, wherein a supporting element is arranged between the borer body and the borer head, and wherein for forming a sliding section, the supporting element has an annular region projecting beyond the lateral surface of the borer body and of the borer head.

18. The tool as claimed in claim 17, wherein the supporting element comprises a disk which is plane-parallel to the end faces, assigned to one another in the coupling region, of borer body and borer head.

19. The tool as claimed in claim 17, wherein a ring-like integrally formed portion is on the supporting element in such a way that the integrally formed portion partly overlaps the lateral surface of the borer body or of the borer head or both lateral surfaces in the coupling region.

20. The tool as claimed in claim 19, wherein a disk and the integrally formed portion in each case form a receiving howl for the ends of the borer body and of the borer head in the coupling region.

21. The tool as claimed in claim 19, wherein guide elements are on the outer circumferential surface of the ring-like integrally formed portion for guiding the boring tool on the bore wall.

22. The tool as claimed in claim 19, wherein there is a wear-inhibiting coating, in particular on the outer circumferential surface of the ring-like integrally formed portion.

23. The tool as claimed in claim 19, wherein the tool has wear-inhibiting elements on the outer circumferential surface of the annular integrally formed portion.

24. The tool as claimed in claim 19, wherein the ring-like integrally formed portion is configured as a flexural spring.

25. The tool as claimed in claim 17, wherein recesses corresponding to the flute-flutes that are formed in the borer body and in the borer head.

26. The tool as claimed in claim 17, wherein the supporting element is at least partly coated.

* * * * *